US012166725B2

(12) United States Patent
Loehr et al.

(10) Patent No.: US 12,166,725 B2
(45) Date of Patent: *Dec. 10, 2024

(54) CONTROLLING UE BEHAVIOR FOR CSI/SRS REPORTING DURING DRX

(71) Applicant: Sun Patent Trust, New York, NY (US)

(72) Inventors: Joachim Loehr, Langen (DE); Hidetoshi Suzuki, Osaka (JP); Prateek Basu Mallick, Langen (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,387

(22) Filed: Jul. 12, 2023

(65) Prior Publication Data

US 2023/0361974 A1 Nov. 9, 2023

Related U.S. Application Data

(63) Continuation of application No. 17/723,288, filed on Apr. 18, 2022, now Pat. No. 11,750,353, which is a
(Continued)

(30) Foreign Application Priority Data

Mar. 20, 2013 (EP) .................... 13160199

(51) Int. Cl.
*H04L 5/00* (2006.01)
*H04W 72/0446* (2023.01)
(Continued)

(52) U.S. Cl.
CPC .......... *H04L 5/0057* (2013.01); *H04L 5/0051* (2013.01); *H04W 72/0446* (2013.01);
(Continued)

(58) Field of Classification Search
CPC ..... H04L 5/0048; H04L 5/0035; H04L 5/001; H04L 5/0053; H04L 5/0023;
(Continued)

(56) References Cited

U.S. PATENT DOCUMENTS 9,125,209 B2 9/2015 Mahmoud et al.
9,686,067 B2 6/2017 Loehr et al.
(Continued)

FOREIGN PATENT DOCUMENTS

EP 3179808 A1 6/2017
EP 3416443 A1 12/2018
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.1.0, Dec. 2012, 57 pages.

(Continued)

*Primary Examiner* — Afshawn M Towfighi
(74) *Attorney, Agent, or Firm* — Seed IP Law Group LLP

(57) ABSTRACT

The invention relates to a method for transmitting a periodic channel quality report (CSI) and/or a sounding reference symbol (SRS) from a UE to an eNodeB. To avoid double decoding at the eNodeB in transient phases, a deterministic behavior of the UE is defined by the invention, according to which the eNodeB can unambiguously determine whether the UE will transmit the CSI/SRS or not. According to one embodiment, the UL grants and/or DL assignments received until and including subframe N−4 only are considered; UL grants and/or DL assignments received by the UE after subframe N−4 are discarded for the determination. Additionally, DRX-related timers at subframe N−4 are consid- (Continued)

ered for the determination. In a second embodiment, DRX MAC control elements from the eNodeB, instructing the UE to enter DRX, i.e., become Non-Active, are only considered for the determination if they are received before subframe N−4, i.e., until and including subframe N−(4+k).

16 Claims, 13 Drawing Sheets

Related U.S. Application Data continuation of application No. 17/038,539, filed on Sep. 30, 2020, now Pat. No. 11,336,417, which is a continuation of application No. 16/674,873, filed on Nov. 5, 2019, now Pat. No. 10,833,831, which is a continuation of application No. 16/387,252, filed on Apr. 17, 2019, now Pat. No. 10,516,520, which is a continuation of application No. 15/957,821, filed on Apr. 19, 2018, now Pat. No. 10,313,085, which is a continuation of application No. 15/798,127, filed on Oct. 30, 2017, now Pat. No. 9,979,529, which is a continuation of application No. 15/594,424, filed on May 12, 2017, now Pat. No. 9,838,187, which is a continuation of application No. 14/777,721, filed as application No. PCT/EP2013/075499 on Dec. 4, 2013, now Pat. No. 9,686,067.

(51) Int. Cl.
　　H04W 72/21　　(2023.01)
　　H04W 72/23　　(2023.01)
　　H04W 76/28　　(2018.01)
　　H04W 24/10　　(2009.01)
(52) U.S. Cl.
　　CPC ........... *H04W 72/21* (2023.01); *H04W 72/23* (2023.01); *H04W 76/28* (2018.02); *H04W 24/10* (2013.01)
(58) Field of Classification Search
　　CPC .... H04L 5/0032; H04L 5/0091; H04W 24/08; H04W 16/28; H04W 24/10; H04W 72/23; H04B 7/0695; H04B 7/088
　　See application file for complete search history.

(56) References Cited

U.S. PATENT DOCUMENTS

| | | | |
|---|---|---|---|
| 9,838,187 B2 | 12/2017 | Loehr et al. | |
| 9,979,529 B2 | 5/2018 | Loehr et al. | |
| 10,313,085 B2 | 6/2019 | Loehr et al. | |
| 10,833,831 B2 | 11/2020 | Loeher et al. | |
| 2010/0130137 A1 | 5/2010 | Pelletier et al. | |
| 2011/0199984 A1 | 8/2011 | Umesh et al. | |
| 2014/0056220 A1 | 2/2014 | Poitau et al. | |
| 2014/0219659 A1 | 8/2014 | Doo et al. | |
| 2016/0278121 A1 | 9/2016 | Agiwal et al. | |
| 2017/0257205 A1 | 9/2017 | Loehr et al. | |
| 2018/0098268 A1 | 4/2018 | Agiwal et al. | |
| 2020/0145982 A1* | 5/2020 | Cheng ................... | H04L 5/0023 |
| 2020/0145983 A1* | 5/2020 | Levitsky ................ | H04L 5/005 |
| 2021/0226688 A1* | 7/2021 | Khoshnevisan ...... | H04L 5/0092 |

FOREIGN PATENT DOCUMENTS

| | | |
|---|---|---|
| JP | 2012119731 A | 6/2012 |
| JP | 2013005366 A | 1/2013 |
| JP | 2013012918 A | 1/2013 |
| JP | 2016519474 A | 6/2016 |
| KR | 10-2014-0099764 A | 8/2014 |
| RU | 2 473 183 C2 | 1/2013 |
| WO | WO 2008135231 A1 | 11/2008 |
| WO | WO 2012013215 A1 | 2/2012 |
| WO | WO 2013025147 A1 | 2/2013 |
| WO | WO 2014146736 A1 | 9/2014 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 10)," 3GPP TS 36.212 V10.0.0, Dec. 2010, 72 pages.
3GPP, "3rd Generation Partnership Project; Technical Specification Group Radio Access Network; Evolved Universal Terrestrial Radio Access (E-UTRA); Physical channels and modulation (Release 10)," 3GPP TS 36.211 V10.0.0, Dec. 2010, 102 pages.
3GPP, "3rd Generation Partnership Project; Technical Specification Group Radio Access Network; Evolved Universal Terrestrial Radio Access (E-UTRA); Physical layer procedures (Release 10)," 3GPP TS 36.213 V10.0.1, Dec. 2010, 98 pages.
3GPP, "3rd Generation Partnership Project; Technical Specification Group Radio Access Network; Evolved Universal Terrestrial Radio Access (E-UTRA); User Equipment (UE) procedures in idle mode (Release 11)," 3GPP TS 36.304 V11.2.0, Dec. 2012, 33 pages.
Canadian Office Action, dated Oct. 23, 2020, for Canadian Application No. 2,904,392, 5 pages.
English Translation of Notice of Preliminary Rejection, dated Jan. 21, 2020, for corresponding Korean Application No. 2015-7025583, 9 pages.
English Translation of Notice of Reasons for Rejection, dated Oct. 3, 2017, for corresponding Japanese Patent Application No. 2016-503557, 8 pages.
Ericsson, "CSI and SRS reporting," R2-130391, Change Request, Current Version: 11.1.0, 3GPP TSG-RAN2 Meeting #81, Malta, Jan. 28-Feb. 1, 2013, 4 pages.
Extended European Search Report dated Oct. 2, 2013, for corresponding EP Application No. 13160199.9, 8 pages.
Indian Examination Report, dated Oct. 22, 2019, for Indian Application No. 5599/CHENP/2015, 7 pages.
Indian Office Action, dated Feb. 3, 2022, for Indian Application No. 202048015223. (5 pages).
International Search Report dated Jul. 17, 2014, for corresponding International Application No. PCT/EP2013/075499, 2 pages.
Japanese Notice of Reasons for Rejection dated Jun. 29, 2021, for the corresponding Japanese Patent Application No. 2020-081330, 7 pages. (With English Translation).
Japanese Office Action, dated Sep. 17, 2019, for Japanese Application No. 2018- 159473, 5 pages. (With English translation).
LG Electronics Inc., "Correction to DRX," R2-083274, 3GPP TSG-RAN2 Meeting #62bis, Warsaw, Poland, Jun. 30-Jul. 4, 2008, 5 pages.
Notice of Preliminary Rejection dated Jan. 4, 2021, for the corresponding Korean Patent Application No. 2020-7028916, 10 pages. (With English Translation).
Samsung, "Correction to remove optionality of CSI/SRS transmission during transient state," R2-130095, 3GPP TSG-RAN WG2 Meeting #81, Work Item Code: TEll 1, LTE-L23, St. Julian's, Malta, Jan. 28-Feb. 1, 2013, 4 pages.
Samsung, "Correction to remove optionality of CSI/SRS transmission during transient state," R2-130095 (with Comments), 3GPP TSG-RAN WG2 Meeting #81, Work Item Code: TEll 1, LTE-L23, St. Julian's, Malta, Jan. 28-Feb. 1, 2013, 4 pages.
Samsung, CATT, Huawei, HiSilicon, Nokia Siemens Networks, Panasonic, Renesas Mobile Europe Ltd., Research in Motion UK Limited, "Correction to remove optionality of CSI/SRS transmission during transient state," R2-130681, 3GPP TSG-RAN WG2 Meeting #81, Work Item Code: TEll1, LTE-L23, St. Julian's, Malta, Jan. 28-Feb. 1, 2013, 4 pages.
Sesia et al., "LTE The UMTS Long Term Evolution—From Theory to Practice," WILEY, 2011, Chapter 16, 31 pages.
ZTE Corporation, "Remaining issue on CSI and SRS report," R2-124710, 3GPP TSG-RAN2#79bis meeting, Agenda Item: 7.8, Bratislava, Slovakia, Oct. 8-12, 2012, 5 pages.

(56) References Cited

OTHER PUBLICATIONS

Russian Office Action, dated Mar. 24, 2022, for Russian Application No. 2020141705, 13 pages.
Samsung, "Discussion on mandating CSI/SRS transmission during uncertain period," R2-124687, Agenda Item: 7.8, 3GPP TSG-RAN WG2 Meeting #79bis, Bratislava, Slovakia Oct. 8-12, 2012. (4 pages).

* cited by examiner

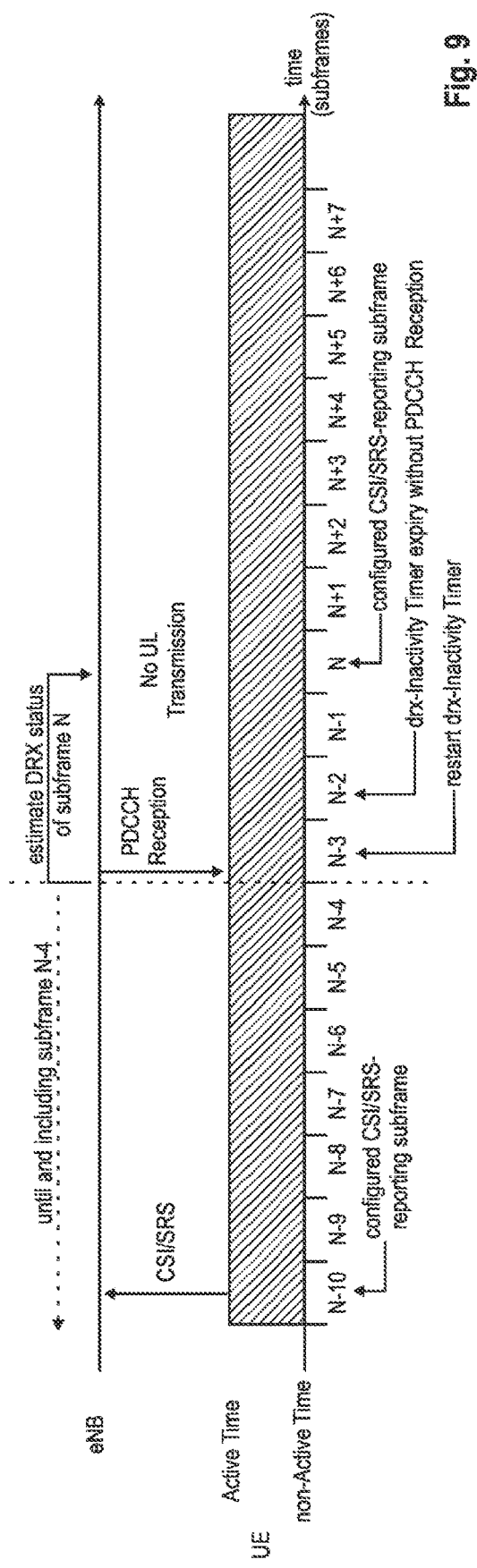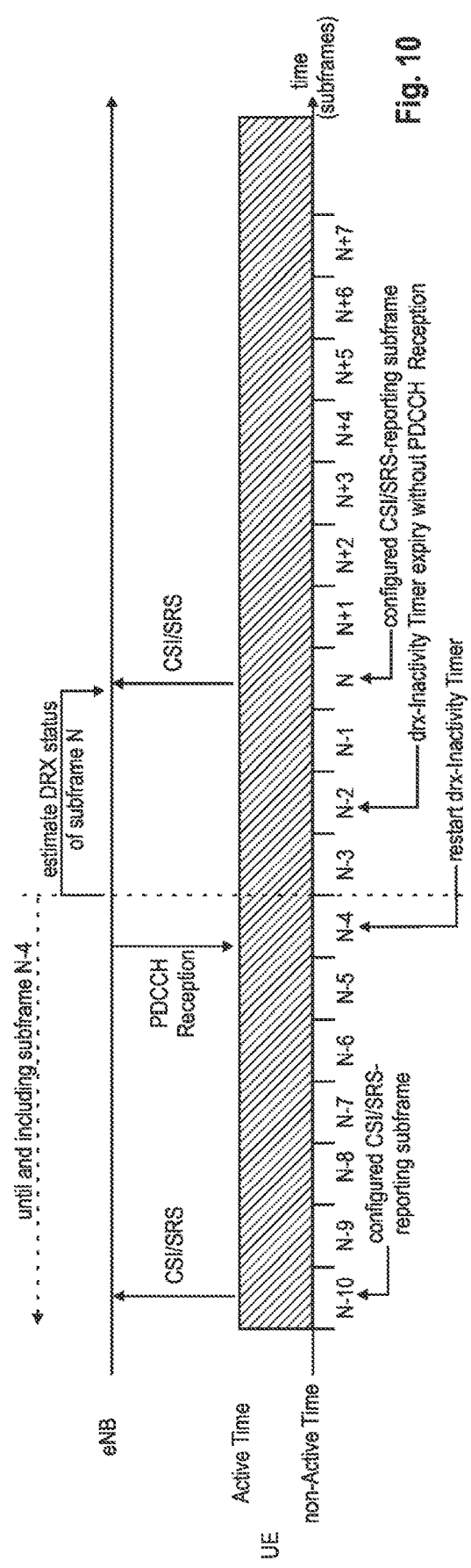

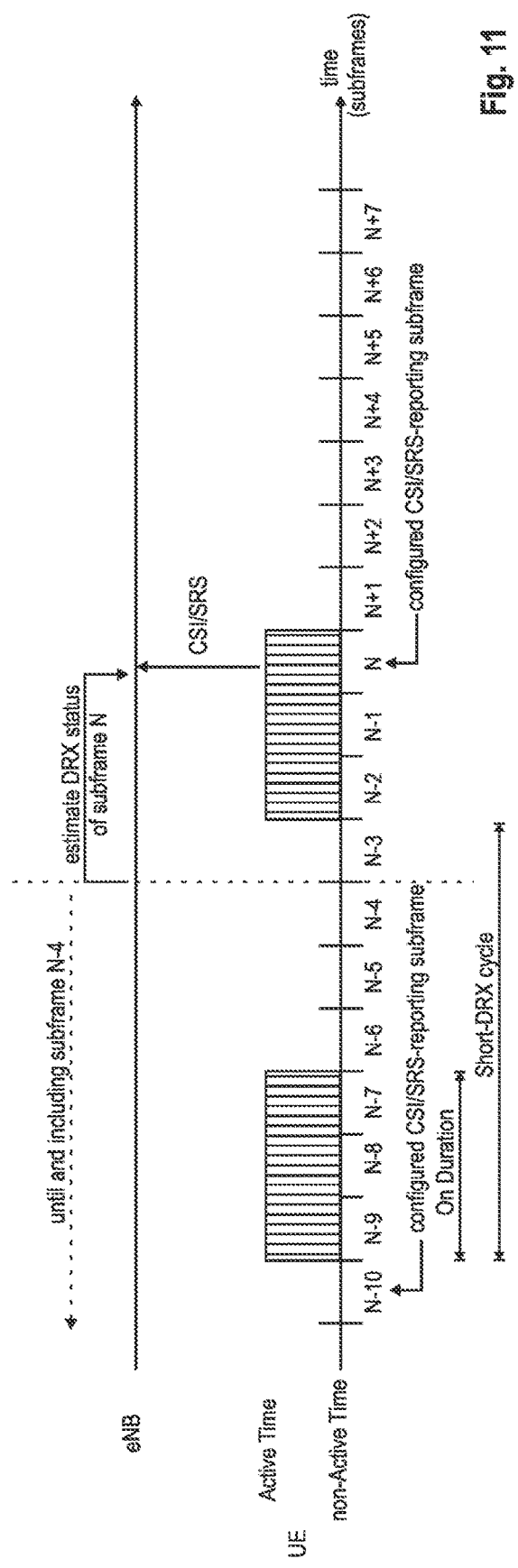
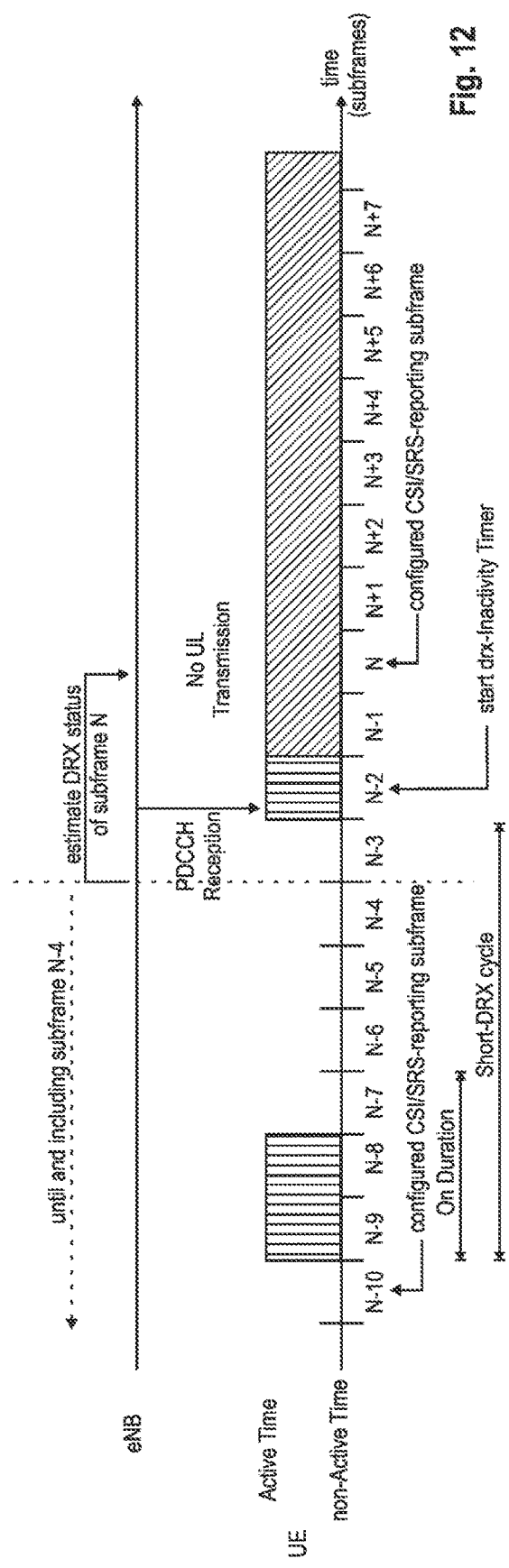

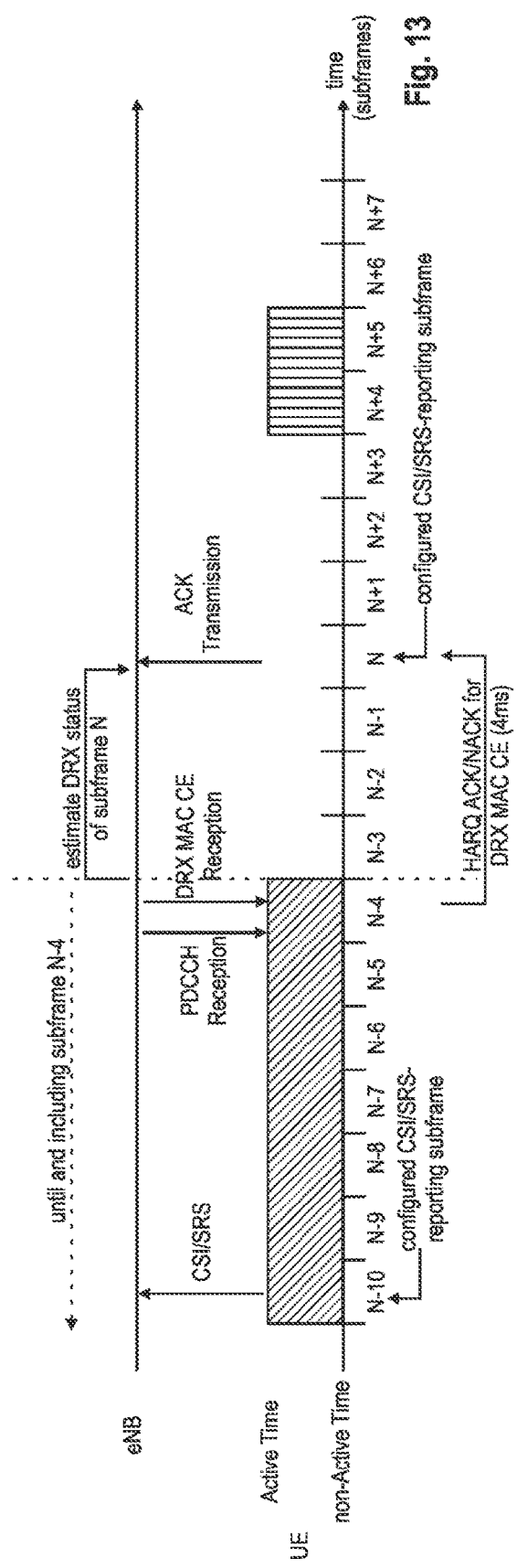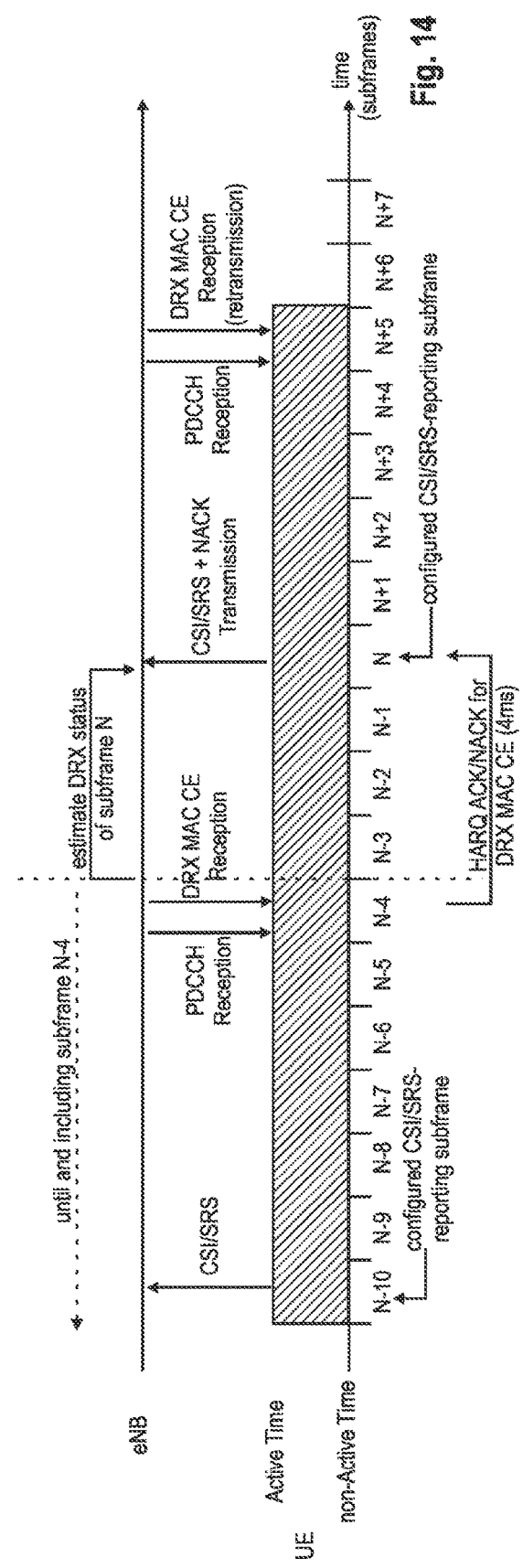

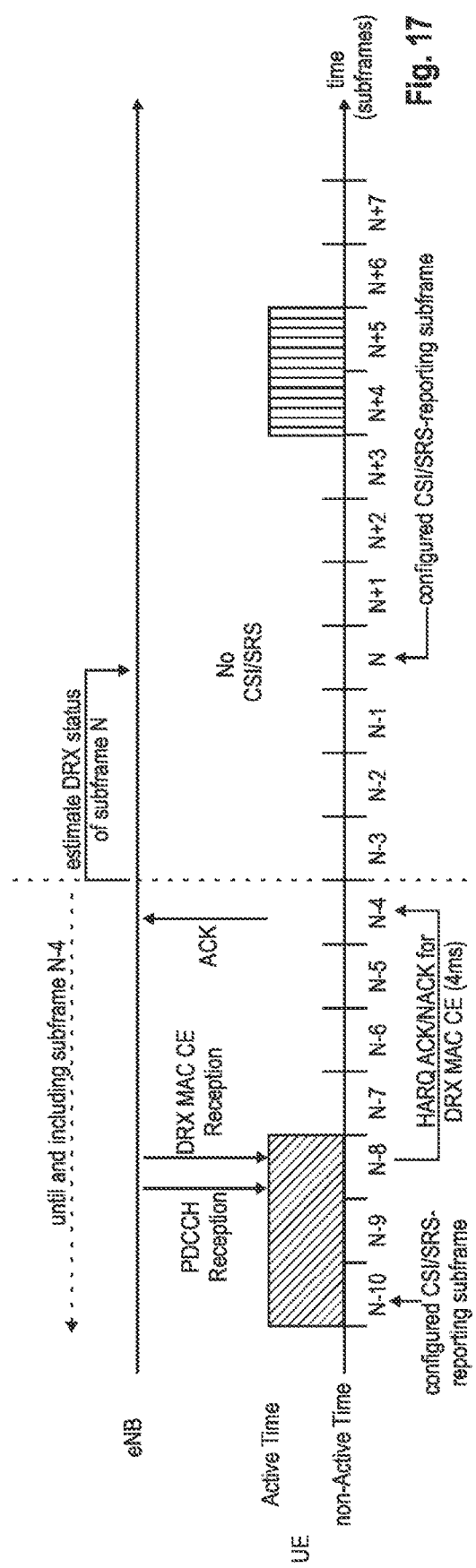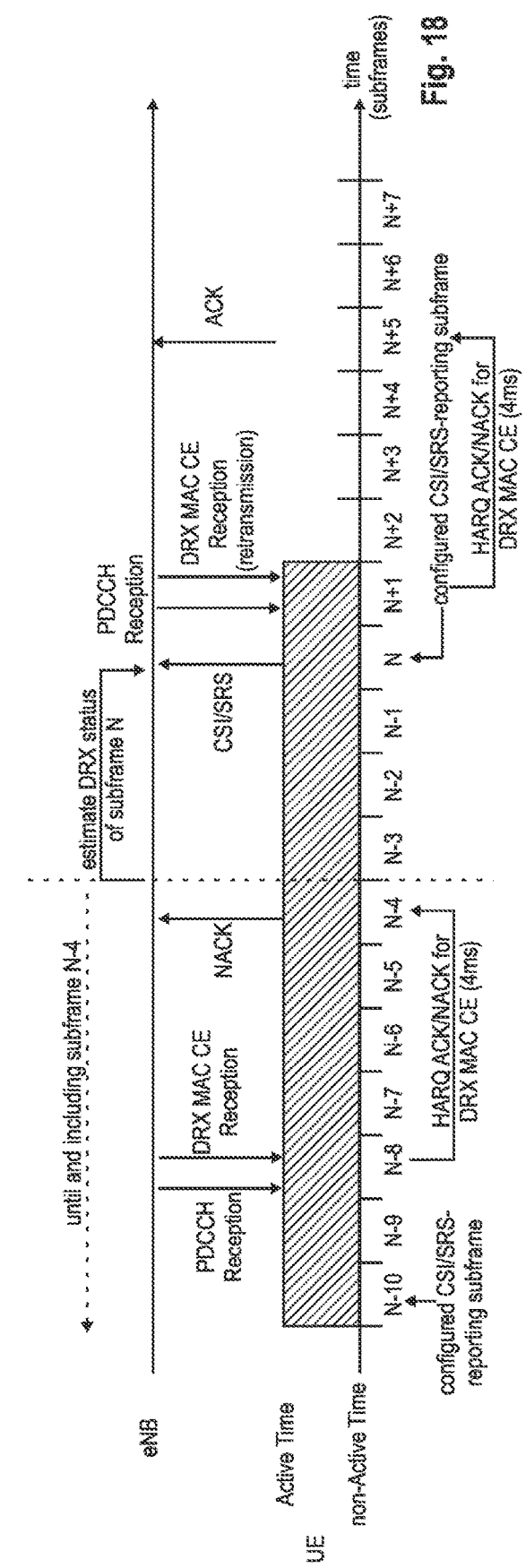

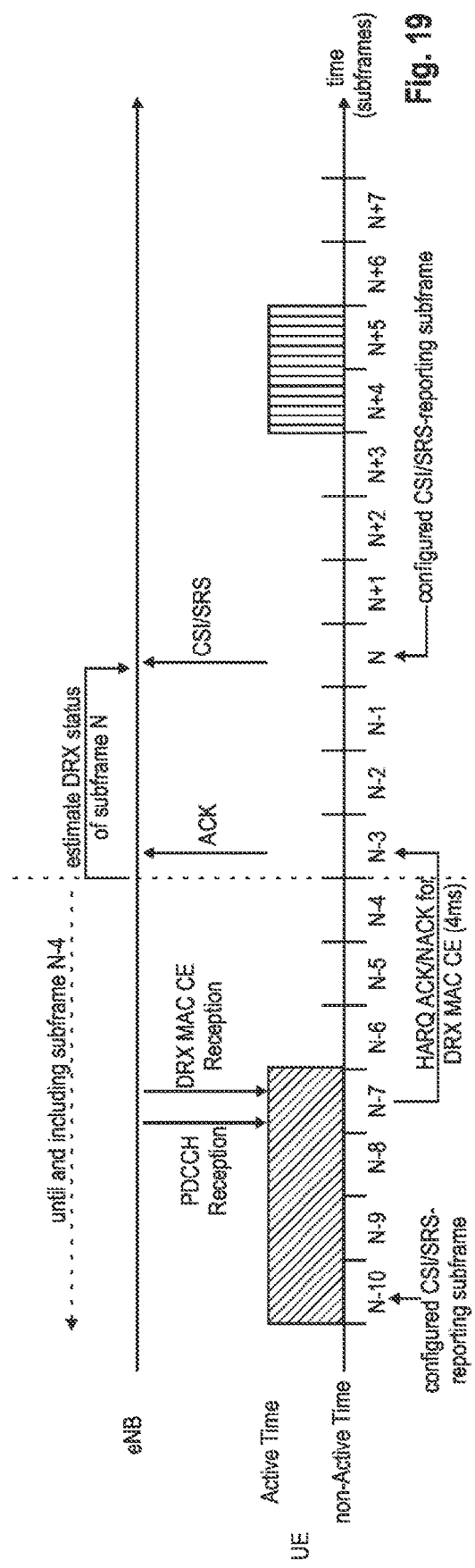
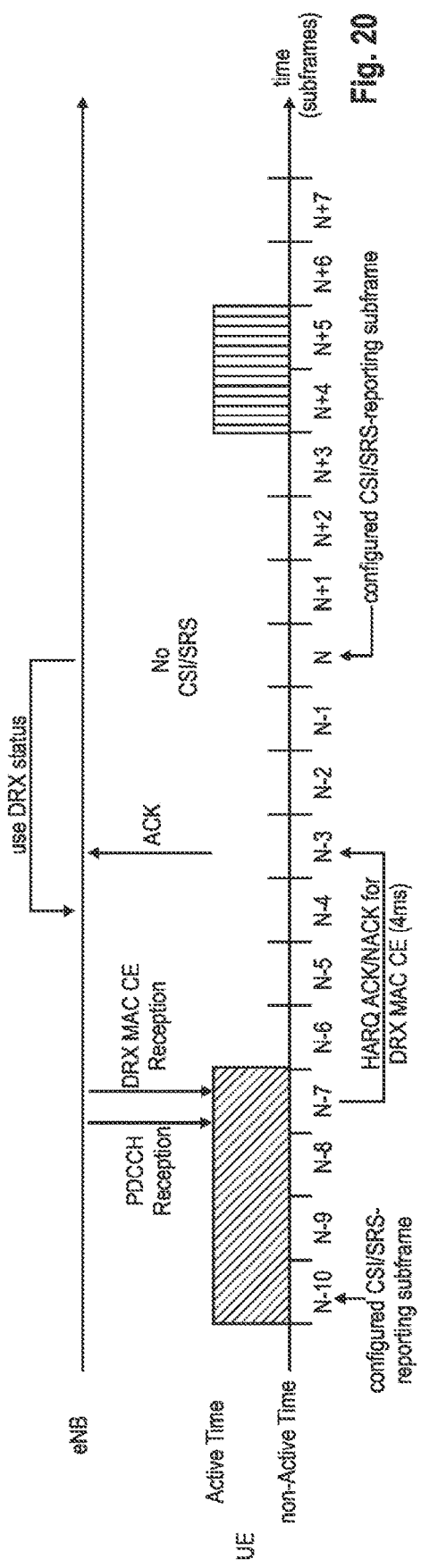

CONTROLLING UE BEHAVIOR FOR CSI/SRS REPORTING DURING DRX

BACKGROUND

Technical Field

The invention relates to methods for transmitting channel quality reports and/or sounding reference symbols from a mobile station to a base station. The invention is also providing the mobile station and the base station for performing the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). The characteristics of the downlink and uplink PCell are:

- For each SCell the usage of uplink resources by the UE, in addition to the downlink ones is configurable; the number of DL SCCs configured is therefore always larger or equal to the number of UL SCCs, and no SCell can be configured for usage of uplink resources only
- The uplink PCell is used for transmission of Layer 1 uplink control information
- The downlink PCell cannot be de-activated, unlike SCells
- From UE perspective, each uplink resource only belongs to one serving cell
- The number of serving cells that can be configured depends on the aggregation capability of the UE
- Re-establishment is triggered when the downlink PCell experiences Rayleigh fading (RLF), not when downlink SCells experience RLF
- The downlink PCell cell can change with handover (i.e., with security key change and RACH procedure)
- Non-access stratum information is taken from the downlink PCell
- PCell can only be changed with handover procedure (i.e., with security key change and RACH procedure)
- PCell is used for transmission of PUCCH The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

LTE is based on only two main states: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information.

The system information mainly consists of parameters by which the network (E-UTRAN) can control the cell (re) selection process. RRC specifies the control signaling applicable for a mobile terminal in RRC_IDLE, namely paging and system information. The mobile terminal behavior in RRC_IDLE is specified in TS 36.304, incorporated herein by reference.

In RRC_CONNECTED the mobile terminal has an established RRC connection with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

FIG. 7 shows a state diagram with an overview of the relevant functions performed by the mobile terminal in IDLE and CONNECTED state.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

A user identity indicating the user(s) that is/are allocated the resources.

RB allocation information for indicating the resources (Resource Blocks (RBs)) on which a user(s) is/are allocated. The number of allocated resource blocks can be dynamic.

The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:

Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)

Cat 3 information: HARQ related information, e.g., hybrid ARQ process number, redundancy version, retransmission sequence number Downlink control information occurs in several formats that differ in overall size and also in the information contained in its fields. The different DCI formats that are currently defined for LTE are described in detail in 3GPP TS 36.212, "Multiplexing and channel coding", section 5.3.3.1 (available at http://www.3gpp.org and incorporated herein by reference).

Uplink Control Information (UCI)

In general, uplink control signaling in mobile communication systems can be divided into two categories:

Data-associated control signaling, is control signaling which is always transmitted together with uplink data and is used in the processing of that data. Examples include transport format indications, "New data" Indicator (NDIs) and MIMO parameters.

Control signaling not associated with data is transmitted independently of any uplink data packet. Examples include HARQ Acknowledgements (ACK/NACK) for downlink data packets, Channel Quality Indicators (CQIs) to support link adaptation, and MIMO feedback such as Rank Indicators (RIs) and Precoding Matrix Indicators (PMI) for downlink transmissions. Scheduling Requests (SRs) for uplink transmissions also fall into this category.

Uplink data-associated control signaling is not necessary in LTE, as the relevant information is already known to the eNodeB. Therefore, only data-non-associated control signaling exists in the LTE uplink.

Consequently, the UCI can consist of:

Scheduling Requests (SRs)

HARQ ACK/NACK in response to downlink data packets on the PDSCH (Physical Downlink Shared CHannel). One ACK/NACK bit is transmitted in the case of single-codeword downlink transmission while two ACK/NACK bits are used in the case of two-codeword downlink transmission.

Channel State Information (CSI) which includes CQIs as well as the MIMO-related feedback consisting of RIs and PMI. 20 bits per subframe are used for the CSI The amount of UCI a UE can transmit in a subframe depends on the number of SC-FDMA symbols available for transmission of control signaling data. The PUCCH supports eight different formats, depending on the amount of information to be signaled. The following UCI formats on PUCCH are supported, according to the following overview

| PUCCH Format | Uplink Control Information (UCI) |
| --- | --- |
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CSI (20 coded bits) |
| Format 2 | CSI and 1- or 2-bit HARQ ACK/NACK for extended CP only |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 | Multiple ACK/NACKs for carrier aggregation: up to 20 ACK/NACK bits plus optional SR, in 48 coded bits |

Using the different defined PUCCH formats (according to 5.4.1 and 5.4.2 of TS 36.211), the following combinations of UCI on PUCCH are supported (see Section 10.1.1 of TS 36.213):

Format 1a for 1-bit HARQ-ACK or in case of FDD for 1-bit HARQ-ACK with positive SR Format 1b for 2-bit HARQ-ACK or for 2-bit HARQ-ACK with positive SR Format 1b for up to 4-bit HARQ-ACK with channel selection when the UE is configured with more than one serving cell or, in the case of TDD, when the UE is configured with a single serving cell Format 1 for positive SR Format 2 for a CSI report when not multiplexed with HARQ-ACK Format 2a for a CSI report multiplexed with 1-bit HARQ-ACK for normal cyclic prefix Format 2b for a CSI report multiplexed with 2-bit HARQ-ACK for normal cyclic prefix Format 2 for a CSI report multiplexed with HARQ-ACK for extended cyclic prefix Format 3 for up to 10-bit HARQ-ACK for FDD and for up to 20-bit HARQ-ACK for TDD Format 3 for up to 11-bit corresponding to 10-bit HARQ-ACK and 1-bit positive/negative SR for FDD and for up to 21-bit corresponding to 20-bit HARQ-ACK and 1-bit positive/negative SR for TDD.

Format 3 for multi-cell HARQ-ACK, 1-bit positive/negative SR and a CSI report for one serving cell.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:

The physical resource(s) on which the data is transmitted (e.g., subcarriers or subcarrier blocks in case of OFDM, codes in case of CDMA). This information allows the mobile terminal (receiver) to identify the resources on which the data is transmitted.

When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:

HARQ process number: Allows the user equipment to identify the hybrid ARQ process on which the data is mapped.

Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g., subcarriers or subcarrier blocks in case of OFDM, codes in case of CDMA).

When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:

HARQ Process number: Tells the user equipment from which hybrid ARQ process it should pick the data.

Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.

Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:

HARQ process number may not be needed, i.e., is not signaled, in case of a synchronous HARQ protocol.

A redundancy and/or constellation version may not be needed, and thus not signaled, if Chase Combining is used (always the same redundancy and/or constellation version) or if the sequence of redundancy and/or constellation versions is pre-defined.

Power control information may be additionally included in the control signaling.

MIMO related control information, such as, e.g., pre-coding, may be additionally included in the control signaling.

In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RVO. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Channel Quality Reporting

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality).

Commonly, mobile communication systems define special control signaling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification PMI: Precoding Matrix Indicator RI: Rank Indicator The MCSI suggests a modulation and coding scheme that should be used for transmission, while the PMI points to a pre-coding matrix/vector that is to be employed for spatial multiplexing and multi-antenna transmission (MIMO) using a transmission matrix rank that is given by the RI. Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4, 3GPP TS 36.212, "Evolved Universal Terrestrial Radio Access (E-UTRA); Multiplexing and channel coding", version 10.0.0, particularly sections 5.2.2, 5.2.4, 5.3.3, 3GPP TS 36.213, "Evolved Universal Terrestrial Radio Access (E-UTRA); Physical layer procedures", version 10.0.1, particularly sections 7.1.7, and 7.2.

In 3GPP LTE, not all of the above identified three channel quality elements are reported at any time. The elements being actually reported depend mainly on the configured reporting mode. It should be noted that 3GPP LTE also supports the transmission of two codewords (i.e., two codewords of user data (transport blocks) may be multiplexed to and transmitted in a single sub-frame), so that feedback may be given either for one or two codewords. The individual reporting modes for the aperiodic channel quality feedback are defined in 3GPP LTE.

The periodicity and frequency resolution to be used by a UE to report on the CSI are both controlled by the eNodeB. The Physical Uplink Control Channel (PUCCH) is used for periodic CSI reporting only (i.e., CSI reporting with a specific periodicity configured by RRC); the PUSCH is used for aperiodic reporting of the CSI, whereby the eNodeB specifically instructs (by a PDCCH) the UE to send an individual CSI report embedded into a resource which is scheduled for uplink data transmission.

In addition, in case of multiple transmit antennas at the eNodeB, CSI values(s) may be reported for a second codeword. For some downlink transmission modes, additional feedback signaling consisting of Precoding Matrix Indicators (PMI) and Rank Indications (RI) is also transmitted by the UE.

In order to acquire CSI information quickly, eNodeB can schedule aperiodic CSI by setting a CSI request bit in an uplink resource grant sent on the Physical Downlink Control Channel.

In 3GPP LTE, a simple mechanism is foreseen to trigger the so-called aperiodic channel quality feedback from the user equipment. An eNodeB in the radio access network sends a L1/L2 control signal to the user equipment to request the transmission of the so-called aperiodic CSI report (see 3GPP TS 36.212, section 5.3.3.1.1 and 3GPP TS 36.213, section 7.2.1 for details). Another possibility to trigger the provision of aperiodic channel quality feedback by the user equipments is linked to the random access procedure (see 3GPP TS 36.213, section 6.2).

Whenever a trigger for providing channel quality feedback is received by the user equipment, the user equipment subsequently transmits the channel quality feedback to the eNodeB. Commonly, the channel quality feedback (i.e., the CSI report) is multiplexed with uplink (user) data on the Physical Uplink Shared CHannel (PUSCH) resources that have been assigned to the user equipment by L1/L2 signaling by the scheduler (eNodeB). In case of carrier aggregation, the CSI report is multiplexed on those PUSCH resources that have been granted by the L1/L2 signal (i.e., the PDCCH) which triggered the channel quality feedback.

Sounding Reference Symbol (SRS)

The SRS are important for uplink channel sounding to support dynamic uplink resource allocation, as well as for reciprocity-aided beamforming in the downlink. Release 10 introduces the possibility of dynamically triggering individual SRS transmissions via the PDCCH; these dynamic aperiodic SRS transmissions are known as "type-1" SRSs, while the Release 8 periodic RRC-configured SRSs are known as "type-0" in Release 10.

An indicator in an uplink resource grant on the PDCCH can be used to trigger a single type 1 SRS transmission. This facilitates rapid channel sounding to respond to changes in traffic or channel conditions, without typing up SRS resources for a long period. In DCI format 0, one new bit can indicate activation of a type 1 SRS according to a set of parameters that is configured beforehand by RRC signaling. In DCI format 4, which is used for scheduling uplink SU-MIMO transmissions, two new bits allow one of three sets of RRC-configured type 1 SRS transmission parameters to be triggered.

The SRS transmissions are always in the last SC-FDMA symbol of the corresponding subframe where reporting is configured/scheduled. PUSCH data transmission is not permitted on the SC-FDMA signal designated for SRS, i.e., PUSCH transmission is punctured such that all symbols but the last are used for PUSCH.

Uplink Control Signaling and Multiplexing

When simultaneous uplink PUSCH data and control signaling are scheduled, the control signaling is normally multiplexed together with the data (in PUSCH) prior to the DFT spreading, in order to preserve the single-carrier low Cubic Metric (CM) property of the uplink transmission. The uplink control channel, PUCCH, is used by a UE to transmit any necessary control signaling only in subframes in which the UE has not been allocated any RBs for PUSCH transmission.

Further information on the multiplexing of the uplink control signaling can be found in Chapters 16.3.1.1, 16.3.3, 16.3.4, 16.3.5, 16.3.6, 16.3.7, 16.4 of *LTE—The UMTS Long Term Evolution—From Theory to Practice*, Edited by Stefanie Sesia, Issam Toufik, Matthew Baker, Second Edition, incorporated herein by reference DRX (Discontinuous Reception)

In order to provide reasonable battery consumption of user equipment, 3GPP LTE (Release 8/9) as well as 3GPP LTE-A (Release 10) provides a concept of discontinuous reception (DRX). Technical Standard TS 36.321 Chapter 5.7 explains the DRX and is incorporated by reference herein.

The following parameters are available to define the DRX UE behavior; i.e., the periods at which the mobile node is active (i.e., in Active Time), and the periods where the mobile node is not active (i.e., in Non-Active Time, while in DRX mode).

On duration (timer): duration in downlink sub-frames that the user equipment, after waking up from DRX (Non-Active Time), receives and monitors the PDCCH. If the user equipment successfully decodes a PDCCH, the user equipment stays awake and starts the DRX Inactivity Timer; [1-200 subframes; 16 steps: 1-6, 10-60, 80, 100, 200]

DRX Inactivity Timer: duration in downlink sub-frames that the user equipment waits to successfully decode a PDCCH, from the last successful decoding of a PDCCH; when the UE fails to decode a PDCCH during this period, it re-enters DRX. The user equipment shall restart the DRX Inactivity Timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional.[1-16 subframes]

Long DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time". The Active Time includes the OnDuration time of the DRX cycle, the time UE is performing continuous reception while the DRX Inactivity Timer has not expired and the time UE is performing continuous reception while waiting for a downlink retransmission after one HARQ RTT. Similarly for the uplink, UE is awake at the subframes where Uplink retransmissions grants can be received, i.e., every 8 ms after initial uplink transmission until maximum number of retransmissions is reached. Based on the above the minimum active time is of length equal to on-duration, and the maximum is undefined (infinite). Furthermore also after having sent an SR on the PUCCH UE will be awake monitoring for a PDCCH allocating UL-SCH Conversely, the Non-Active Time is basically the duration of downlink subframes during which a UE can skip reception of downlink channels for battery saving purposes.

The operation of DRX gives the mobile terminal the opportunity to deactivate the radio circuits repeatedly (according to the currently active DRX cycle) in order to save power. Whether the UE indeed remains in Non-Active Time (i.e., is not active) during the DRX period may be decided by the UE; for example, the UE usually performs interfrequency measurements which cannot be conducted during the On-Duration, and thus need to be performed some other time.

The parameterization of the DRX cycle involves a tradeoff between battery saving and latency. On the one hand, a long DRX period is beneficial for lengthening the UE's battery life. For example, in the case of a web browsing service, it is usually a waste of resources for a UE continuously to receive downlink channels while the user is reading a downloaded web page. On the other hand, a shorter DRX period is better for faster response when data transfer is resumed—for example when a user requests another web page.

To meet these conflicting requirements, two DRX cycles—a short cycle and a long cycle—can be configured for each UE. The transition between the short DRX cycle, the long DRX cycle and continuous reception is controlled either by a timer or by explicit commands from the eNB. In some sense, the short DRX cycle can be considered as a confirmation period in case a late packet arrives, before the UE enters the long DRX cycle—if data arrives at the eNB while the UE is in the short DRX cycle, the data is scheduled for transmission at the next wake-up time and the UE then resumes continuous reception. On the other hand, if no data arrives at the eNB during the short DRX cycle, the UE enters the long DRX cycle, assuming that the packet activity is finished for the time being.

Available DRX values are controlled by the network and start from non-DRX up to x seconds. Value x may be as long as the paging DRX used in IDLE. Measurement requirement and reporting criteria can differ according to the length of the DRX interval, i.e., long DRX intervals may experience more relaxed requirements.

When DRX is configured, periodic CQI/SRS reports shall only be sent by the UE during the "active-time". RRC can further restrict periodic CQI reports so that they are only sent during the on-duration.

In FIG. 8 a per-subframe example of the DRX cycle is shown. The UE checks for scheduling messages (indicated by its C-RNTI on the PDCCH) during the 'On Duration' period of either the long DRX cycle or the short DRX cycle depending on the currently active cycle. When a scheduling message is received during an 'On Duration', the UE starts an 'Inactivity Timer' and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a 'Short DRX cycle timer'. The short DRX cycle may also be initiated by means of a DRX MAC Control Element from the eNodeB, instructing the UE to enter DRX. When the short DRX cycle timer expires, the UE moves into a long DRX cycle. In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

Above mentioned DRX related timers like DRX-Inactivity timer, HARQ RTT timer, DRX retransmission timer and Short DRX cycle timer are started and stopped by events such as reception of a PDCCH grant or MAC Control element (DRX MAC CE); hence the DRX status (active time or non-active time) of the UE can change from one subframe to another and is hence not always predictable by the mobile station or eNodeB.

There is only one DRX cycle per UE. All aggregated component carriers follow this DRX pattern.

Shortcomings of Current Periodic CSI/SRS Reporting During DRX

As mentioned before, the DRX status (i.e., Active Time/non-Active Time) of a UE can change from subframe to subframe. DRX-related timers (like DRX-Inactivity timer, HARQ RTT timer, DRX retransmission timer) are started and stopped by various events, such as reception of a PDCCH grant or of MAC control elements (DRX MAC CE), thus putting the UE into Active Time or non-Active Time. The behavior of the UE for Active Time and non-Active Time is clearly defined by the standard. Correspondingly, the UE shall transmit periodic CSI reports and SRS only during the Active time. However, the UE needs some time to process received signaling or information changing its DRX status, and also need some time to prepare the CSI report and SRS. The processing time strongly depends on the implementation of the UE. This however may lead to problems during operation of the UE, as will be explained in detail below.

Assuming the UE is currently in Active Time and the DRX Inactivity timer is running, if a UE receives in the last subframe before the DRX Inactivity timer expires (e.g., subframe N) a PDCCH indicating a new transmission (UL or DL), the UE will also be in Active Time in the next subframe, i.e., subframe N+1 and the DRX Inactivity timer is restarted.

Due to the processing time in the UE, the UE may only now at the beginning/middle of subframe N+1 that subframe N+1 is still Active Time. Assuming that the periodic CSI report is configured to be transmitted in subframe N+1, the UE may not have time to prepare the CSI report for transmission, since it initially assumed to enter DRX, i.e., be in non-Active Time during subframe N+1, and thus to not be necessary to transmit the CSI report. Consequently, the UE might not be able to transmit the periodic CSI report in subframe N+1, contrary to the specification mandating the UE to transmit periodic CSI on PUCCH during Active Time in the configured subframes.

In summary, the UE behavior with respect to CSI/SRS transmission cannot immediately follow the DRX status of the UE, since the UE needs some time to become aware of the signaling and to prepare the necessary uplink transmission accordingly. The time after the Active Time has been suddenly started/prolonged or ended due to reception of respective signaling from the network is generally referred to as "transient phase" or "uncertain period". In order to account for the processing delay in the UE, an exception on the periodic CSI transmission on PUCCH and periodic SRS transmission has been introduced for LTE Rel-8/9/10 in TS 36.321, as follows.

A UE may optionally choose to not send CQI/PMI/RI/PTI reports on PUCCH and/or type-0-triggered SRS transmissions for up to 4 subframes following a PDCCH indicating a new transmission (UL or DL) received in subframe n-i, where n is the last subframe of Active Time and i is an integer value from 0 to 3. After Active Time is stopped due to the reception of a PDCCH or a MAC control element a UE may optionally choose to continue sending CQI/PMI/RI/PTI reports on PUCCH and/or SRS transmissions for up to 4 subframes. The choice not to send CQI/PMI/RI/PTI reports on PUCCH detect the control information correctly. Some of these combinations are given in the table below, which is taken from R2-124687; it should be noted that the list is not complete, but shall give an overview.

| Case (possible collisions during transient phase) | If CSI/SRS is transmitted | If CSI/SRS is not transmitted | Double decoding needed? |
|---|---|---|---|
| CSI + Data | Data (RMed) + CSI | Data | Yes |
| CSI + AN | CSI + AN (jointly coded) | AN | Yes |
| CSI + SR | SR (CSI dropped) | SR | No |
| CSI + Data + SR | Data (RMed) + CSI | Data | Yes |
| CSI + Data + AN | [CSI & Data Muxed] (RMed) + AN | Data (RMed) + AN | Yes |
| CSI + AN + SR | AN + SR | AN + SR | No |
| CSI + Data + AN + SR | [CSI & Data Muxed] (RMed) + AN | Data (RMed) + AN | Yes |
| SRS + Data | Data (RMed) + SRS | Data | Yes |
| SRS + AN | [AN (shorten format) + SRS] or AN (normal format) | AN (shorten format) or AN (normal format) | No |
| SRS + SR | [SR (shorten format) + SRS] or SR (normal format) | SR (shorten format) or SR (normal format) | No |
| SRS + Data + SR | Data (RMed) + SRS | Data | Yes |
| SRS + Data + AN | Data (RMed over AN/SRS) + AN + SRS | Data (RMed over AN) + AN | Yes |
| SRS + AN + SR | [AN + SR] (shorten format) + SRS or [AN + SR] (normal format) | [AN + SR] (shorten format) or [AN + SR] (normal format) | No |
| SRS + Data + AN + SR | Data (RMed over AN/SRS) + AN + SRS | Data (RMed over AN) + AN | Yes |
| CSI + SRS + Data | Data (RMed over CSI/SRS) + CSI + SRS | Data (RMed over CSI) + CSI | Yes |
| CSI + SRS + AN | AN (shorten format) + SRS or AN (normal format) | AN (shorten format) or AN (normal format) | No |
| CSI + SRS + SR | SR (shorten format) + SRS | SR (shorten format) | No |
| CSI + SRS + Data + SR | Data (RMed over CSI/SRS) + CSI + SRS | Data (RMed over CSI) + CSI | Yes |
| CSI + SRS + Data + AN | [CSI & Data Muxed] (RMed over AN/SRS) + AN + SRS | Data (RMed over AN) + AN | Yes |
| CSI + SRS + AN + SR | AN + SR (shorten format) + SRS | AN + SR (normal format) | Yes |
| CSI + SRS + Data + AN + SR | [CSI & Data Muxed] (RMed over AN/SRS) + AN + SRS | Data (RMed over AN) + AN | Yes | and/Or type-0-triggered SRS transmissions is not applicable for subframes where onDurationTimer is running and is not applicable for subframes n−i to n.

Despite the above exception, the eNB in general expects uplink transmissions from the UE according to the specification. Thus, with respect to CSI/SRS reporting, when the UE is in Active Time, the UE is expected to transmit periodic CSI reports on PUCCH and SRS, depending on the periodicity of CSI/SRS. Correspondingly, the eNB does not expect any periodic CSI/SRS transmission from UE in subframes where the UE is in non-Active Time.

However, due to the UE behavior introduced to cover the "transient phases", the UE behavior for these "transient phases" is not predictable for the eNB. Therefore, the network must be able to correctly decode the PUCCH channel or the PUSCH channel for cases, when it does not know if periodic CSI or SRS reports have been sent or not. In other words, double decoding is necessary at the UE to cover both transmission cases, i.e., with or without CSI/SRS. For instance:

If CSI happens to coincide with a DL HARQ PUCCH transmission in the transient phase, then, the network needs to perform double decoding to handle both the case, when CSI has been sent and the case when CSI has not been sent.

If SRS happens to coincide with a PUSCH transmission that is outside the configured bandwidth of SRS in the transient phase, then the network needs to perform double decoding to handle both the case when SRS has been sent and the case when SRS has not been sent.

There are many more combinations of control information for which eNB needs to perform double decoding for two different data transmissions formats in order to be able to As can be seen, the double decoding caused by the transient phases might happen quite often, and causes unnecessary complexity and computational cost within the network. The decoding in the eNB relies on the uplink transmissions having a certain transmission format, as for example Format 2, 2a and 2b always including a CSI. When the transmission format changes due to the sudden transmission or non-transmission of the CSI, the decoding in the eNB may fail due to the wrong transmission format, which in turn leads to degradation of the throughput.

This applies in a similar manner for the transmission of the SRS. Provided the assigned resource blocks for PUSCH are not overlapping with the cell-specific SRS frequency region, in case the UE doesn't transmit SRS in this subframe, the UE uses the last SC-FDMA symbol in the subframe for PUSCH. In case the UE transmit SRS in this subframe, the UE does not use the last SC-FDMA symbol for PUSCH. Therefore, depending on whether UE is transmitting SRS (which is dependent on the DRX status of the subframe), the number of SC-FDMA symbols for PUSCH changes, which in turn means that eNB would have to check two different PUSCH symbol usages in those subframes. However, this uncertainty can be easily avoided by the eNB by assigning only PUSCH resources to the UE which lie within the cell-specific SRS region, which is majority of the assignment; in this case the UE will never map PUSCH on the last SC-FDMA symbol in a subframe where periodic SRS has been configured. Nevertheless, the problem remains for the case where the assigned resource blocks for the PUSCH do not lie within the cell-specific SRS region.

BRIEF SUMMARY

One object of the invention is to provide a deterministic UE behavior for transmitting CSI and/or SRS, that solves the problems of the prior art as discussed above.

The object is solved by the subject matter of the independent claims. Advantageous embodiments are subject to the dependent claims.

The present invention provides a method of a first embodiment for transmitting a channel quality information report and/or a sounding reference symbol from a mobile station to a base station in a mobile communication system in subframe N. Subframe N is configured for the mobile station for transmission of periodic channel quality information reports and/or periodic sounding reference symbols. It is determined whether the mobile station will be in DRX Active Time or DRX Non-Active Time in subframe N, at least based on:
- uplink resource grants for the uplink shared channel and/or downlink resource assignments for the downlink shared channel, received by the mobile station until and including subframe N−4 only, and
- DRX-related timers running for the mobile station, including at least one of a DRX Inactivity Timer, a DRX OnDuration Timer and a DRX Retransmission Timer.

The mobile station transmits the channel quality information report and/or the sounding reference symbol to the base station in subframe N, in case the mobile station is determined to be in DRX Active Time in subframe N.

According to an advantageous variant of the first embodiment of the invention which can be used in addition or alternatively to the above, the base station performs the steps of:
- determining whether the mobile station will be in DRX Active Time or DRX Non-Active Time in subframe N, at least based on:
  - uplink resource grants for the uplink shared channel and/or downlink resource assignments for the downlink shared channel, transmitted to the mobile station until and including subframe N−4 only, and
  - DRX-related timers running for the mobile station, including at least one of a DRX Inactivity Timer, a DRX OnDuration Timer and a DRX Retransmission Timer,
- receiving the channel quality information report and/or the sounding reference symbol from the mobile station in subframe N, in case the mobile station is determined by the determining step to be in DRX Active Time in subframe N.

According to an advantageous variant of the first embodiment of the invention which can be used in addition or alternatively to the above, the determining is further based on MAC control elements, relating to the DRX operation, received by the mobile station until and including subframe N−(4+k) only, where k is an integer value from 1 to K. Alternatively, the determining is further based on MAC control elements, relating to the DRX operation, for which an acknowledgment is transmitted by the mobile station until and including subframe N−(3+k) only, where k is an integer value from 1 to K. According to an advantageous variant of the first embodiment of the invention which can be used in addition or alternatively to the above, the DRX-related timers are considered in the determining based on uplink resource grants for the uplink shared channel and/or downlink resource assignments for the downlink shared channel, received by the mobile station until and including subframe N−4 only, and further based on the value of the DRX-related timers at subframe N−4.

The present invention provides a mobile station of a first embodiment for transmitting a channel quality information report and/or a sounding reference symbol to a base station in a mobile communication system in subframe N. Subframe N is configured for the mobile station for transmission of periodic channel quality information reports and/or periodic sounding reference symbols. A processor of the mobile station determines whether the mobile station will be in DRX Active Time or DRX Non-Active Time in subframe N, at least based on:
- uplink resource grants for the uplink shared channel and/or downlink resource assignments for the downlink shared channel, received by the mobile station until and including subframe N−4 only, and
- DRX-related timers running for the mobile station, including at least one of a DRX Inactivity Timer, a DRX OnDuration Timer and a DRX Retransmission Timer.

A transmitter of the mobile station transmits the channel quality information report and/or the sounding reference symbol to the base station in subframe N, in case the mobile station is determined by the processor to be in DRX Active Time in subframe N.

According to an advantageous variant of the mobile station of the first embodiment of the invention which can be used in addition or alternatively to the above, the processor performs the determining further based on MAC control elements, relating to the DRX operation, received by the mobile station until and including subframe N−(4+k) only, where k is an integer value from 1 to K. Alternatively, the processor performs the determining further based on MAC control elements, relating to the DRX operation, for which an acknowledgment is transmitted by the mobile station until and including subframe N−(3+k) only, where k is an integer value from 1 to K. The present invention provides a base station of a first embodiment for receiving a channel quality information report and/or a sounding reference symbol from a mobile station a mobile communication system in subframe N. Subframe N is configured for the mobile station for transmission of periodic channel quality information reports and/or periodic sounding reference symbols. A processor of the base station determines whether the mobile station will be in DRX Active Time or DRX Non-Active Time in subframe N, at least based on:
- uplink resource grants for the uplink shared channel and/or downlink resource assignments for the downlink shared channel, transmitted to the mobile station until and including subframe N−4 only, and
- DRX-related timers running for the mobile station, including at least one of a DRX Inactivity Timer, a DRX OnDuration Timer and a DRX Retransmission Timer, A receiver of the base station receives the channel quality information report and/or the sounding reference symbol from the mobile station in subframe N, in case the mobile station is determined by the processor to be in DRX Active Time in subframe N.

The present invention provides a method of a second embodiment for transmitting a channel quality information report and/or a sounding reference symbol from a mobile station to a base station in a mobile communication system in subframe N. Subframe N is configured for the mobile station for transmission of periodic channel quality information reports and/or periodic sounding reference symbols. It is determined whether the mobile station will be in DRX Active Time or DRX Non-Active Time in subframe N, at least based on MAC control elements, relating to the DRX operation, received by the mobile station until and including subframe N−(4+k) only, where k is an integer value from 1 to K. The mobile station transmits the channel quality information report and/or the sounding reference symbol to the base station in subframe N, in case the mobile station is determined by the determining step to be in DRX Active Time in subframe N. According to an advantageous variant of the method of the second embodiment of the invention which can be used in addition or alternatively to the above, the base station determines whether the mobile station will be in DRX Active Time or DRX Non-Active Time in subframe N, at least based on MAC control elements, relating to the DRX operation, transmitted to the mobile station until and including subframe N−(4+k) only, where k is an integer value from 1 to K, and based on feedback received from the mobile station relating to the decoding success for the MAC control elements. The base station receives the channel quality information report and/or the sounding reference symbol from the mobile station in subframe N, in case the mobile station is determined by the determining to be in DRX Active Time in subframe N.

According to an advantageous variant of the method of the second embodiment of the invention which can be used in addition or alternatively to the above, the determining disregards any MAC control elements, relating to the DRX operation, destined for the mobile station in subframes N−(3+k) to N.

According to an advantageous variant of the method of the second embodiment of the invention which can be used in addition or alternatively to the above, the mobile station does not transmit the channel quality information report and/or the sounding reference symbol to the base station in subframe N, in case the mobile station is determined by the determining step to be in DRX Non-Active Time in subframe N.

According to an advantageous variant of the method of the second embodiment of the invention which can be used in addition or alternatively to the above, the determining is further based on uplink resource grants for the uplink shared channel and/or downlink resource assignments for the downlink shared channel, received by the mobile station until and including subframe N−4 only. Alternatively, the determining is further based on uplink resource grants for the uplink shared channel and/or downlink resource assignments for the downlink shared channel, received by the mobile station until and including subframe N−(4+k) only.

According to an advantageous variant of the method of the second embodiment of the invention which can be used in addition or alternatively to the above, the determining is further based on DRX-related timers running for the mobile station, including at least one of a DRX Inactivity Timer, a DRX OnDuration Timer and a DRX Retransmission Timer.

According to an advantageous variant of the method of the second embodiment of the invention which can be used in addition or alternatively to the above, the determining comprises the step of estimating the state of the DRX-related timers at subframe N based on uplink resource grants for the uplink shared channel and/or downlink resource assignments for the downlink shared channel, received by the mobile station until and including subframe N−4 only, and further based on the value of the DRX-related timers at subframe N−4.

According to an advantageous variant of the method of the second embodiment of the invention which can be used in addition or alternatively to the above, the mobile station transmits an acknowledgment or non-acknowledgment in subframe N−k for the MAC control element, relating to the DRX operation, received by the mobile station in subframe N−(4+k). The mobile station transmits an acknowledgment or non-acknowledgment in subframe N for a MAC control element, relating to the DRX operation, received by the mobile station in subframe N−4.

According to an advantageous variant of the method of the second embodiment of the invention which can be used in addition or alternatively to the above, processing of the determining step is started in the mobile station at subframe N−(4+k), and after finishing the process of the determining step, preparing by the mobile station the channel quality report and/or the sounding reference symbol for transmission in subframe N for the transmission step.

The present invention provides a mobile station of the second embodiment for transmitting a channel quality information report and/or a sounding reference symbol to a base station in a mobile communication system in subframe N. Subframe N is configured for the mobile station for transmission of periodic channel quality information reports and/or periodic sounding reference symbols. A processor of the mobile station determines whether the mobile station will be in DRX Active Time or DRX Non-Active Time in subframe N, at least based on MAC control elements, relating to the DRX operation, received by the mobile station until and including subframe N−(4+k) only, where k is an integer value from 1 to K. A transmitter of the mobile station transmits the channel quality information report and/or the sounding reference symbol to the base station in subframe N, in case the mobile station is determined by the processor to be in DRX Active Time in subframe N.

According to an advantageous variant of the mobile station of the second embodiment of the invention which can be used in addition or alternatively to the above, the processor disregards any MAC control elements, relating to the DRX operation, destined for the mobile station in subframes N−(3+k) to N.

According to an advantageous variant of the mobile station of the second embodiment of the invention which can be used in addition or alternatively to the above, the processor performs the determining further based on uplink resource grants for the uplink shared channel and/or downlink resource assignments for the downlink shared channel, received by the mobile station until and including subframe N−4 only. Alternatively, the processor performs the determining further based on the uplink resource grants for the uplink shared channel and/or downlink resource assignments for the downlink shared channel, received by the mobile station until and including subframe N−(4+k) only.

According to an advantageous variant of the mobile station of the second embodiment of the invention which can be used in addition or alternatively to the above, the processor performs the determining further based on DRX-related timers running for the mobile station, including at least one of a DRX Inactivity Timer, a DRX OnDuration Timer and a DRX Retransmission Timer.

According to an advantageous variant of the mobile station of the second embodiment of the invention which can be used in addition or alternatively to the above, the processor performs the determining comprising the step of estimating the state of the DRX-related timers at subframe N based on uplink resource grants for the uplink shared channel and/or downlink resource assignments for the downlink shared channel, received by the mobile station until and including subframe N−4 only, and further based on the value of the DRX-related timers at subframe N−4.

The present invention provides a base station of the second embodiment for receiving a channel quality information report and/or a sounding reference symbol from a mobile station a mobile communication system in subframe N. Subframe N is configured for the mobile station for transmission of periodic channel quality information reports and/or periodic sounding reference symbols. A processor of the base station determines whether the mobile station will be in DRX Active Time or DRX Non-Active Time in subframe N, at least based on MAC control elements, relating to the DRX operation, transmitted to the mobile station until and including subframe N−(4+k) only, where k is an integer value from 1 to K, and based on feedback received from the mobile station relating to the decoding success for the transmitted MAC control elements. A receiver of the base station receives the channel quality information report and/or the sounding reference symbol from the mobile station in subframe N, in case the mobile station is determined by the processor to be in DRX Active Time in subframe N.

The present invention provides a method of a third embodiment for transmitting a channel quality information report and/or a sounding reference symbol from a mobile station to a base station in a mobile communication system in subframe N. Subframe N is configured for the mobile station for transmission of periodic channel quality information reports and/or periodic sounding reference symbols. It is determined whether the mobile station will be in DRX Active Time or DRX Non-Active Time in subframe N, at least based on:
  uplink resource grants for the uplink shared channel and/or downlink resource assignments for the downlink shared channel, received by the mobile station until and including subframe N−(4+k) only, where k is an integer value from 1 to K, and
  MAC control elements, relating to the DRX operation, received by the mobile station until and including subframe N−(4+k) only, where k is an integer value from 1 to K.

The mobile station transmits the channel quality information report and/or the sounding reference symbol to the base station in subframe N, in case the mobile station is determined by the determining to be in DRX Active Time in subframe N.

According to an advantageous variant of the method of the third embodiment of the invention which can be used in addition or alternatively to the above, the base station determines whether the mobile station will be in DRX Active Time or DRX Non-Active Time in subframe N, at least based on:
  uplink resource grants for the uplink shared channel and/or downlink resource assignments for the downlink shared channel, transmitted to the mobile station until and including subframe N−(4+k) only, where k is an integer value from 1 to K, and
  MAC control elements, relating to the DRX operation, transmitted to the mobile station until and including subframe N−(4+k) only, where k is an integer value from 1 to K, The base station receives the channel quality information report and/or the sounding reference symbol from the mobile station in subframe N, in case the mobile station is determined by the determining step to be in DRX Active Time in subframe N.

According to an advantageous variant of the method of the third embodiment of the invention which can be used in addition or alternatively to the above, the determining is further based on DRX-related timers running for the mobile station, including at least one of a DRX Inactivity Timer, a DRX OnDuration Timer and a DRX Retransmission Timer. Preferably the determining then comprises estimating the state of the DRX-related timers at subframe N based on uplink resource grants for the uplink shared channel and/or downlink resource assignments for the downlink shared channel, received by the mobile station until and including subframe N−4 only, and further based on the value of the DRX-related timers at subframe N−4.

The present invention provides a mobile station of the third embodiment for transmitting a channel quality information report and/or a sounding reference symbol to a base station in a mobile communication system in subframe N. Subframe N is configured for the mobile station for transmission of periodic channel quality information reports and/or periodic sounding reference symbols. A processor of the mobile station determines whether the mobile station will be in DRX Active Time or DRX Non-Active Time in subframe N, at least based on:
  uplink resource grants for the uplink shared channel and/or downlink resource assignments for the downlink shared channel, received by the mobile station until and including subframe N−(4+k) only, where k is an integer value from 1 to K, and
  MAC control elements, relating to the DRX operation, received by the mobile station until and including subframe N−(4+k) only, where k is an integer value from 1 to K, A transmitter of the mobile station transmits the channel quality information report and/or the sounding reference symbol to the base station in subframe N, in case the mobile station is determined by the processor to be in DRX Active Time in subframe N.

According to an advantageous variant of the mobile station of the third embodiment of the invention which can be used in addition or alternatively to the above, the processor performs the determining further based on DRX-related timers running for the mobile station, including at least one of a DRX Inactivity Timer, a DRX OnDuration Timer and a DRX Retransmission Timer.

The present invention also provides a base station of the third embodiment for receiving a channel quality information report and/or a sounding reference symbol from a mobile station a mobile communication system in subframe N. Subframe N is configured for the mobile station for transmission of periodic channel quality information reports and/or periodic sounding reference symbols. A processor of the base station determines whether the mobile station will be in DRX Active Time or DRX Non-Active Time in subframe N, at least based on:
  uplink resource grants for the uplink shared channel and/or downlink resource assignments for the downlink shared channel, transmitted to the mobile station until and including subframe N−(4+k) only, where k is an integer value from 1 to K, and
  MAC control elements, relating to the DRX operation, transmitted to the mobile station until and including subframe N−(4+k) only, where k is an integer value from 1 to K.

A receiver of the base station receives the channel quality information report and/or the sounding reference symbol from the mobile station in subframe N, in case the mobile station is determined by the determining step to be in DRX Active Time in subframe N.

The present invention further provides a method of a fourth embodiment for transmitting a channel quality information report and/or a sounding reference symbol from a mobile station to a base station in a mobile communication system in subframe N. Subframe N is configured for the mobile station for transmission of periodic channel quality information reports and/or periodic sounding reference symbols. It is determined whether the mobile station will be in DRX Active Time or DRX Non-Active Time in subframe N, at least based on MAC control elements, relating to the DRX operation, for which an acknowledgment is transmitted by the mobile station until and including subframe N−(3+k), where k is an integer value from 1 to K. The mobile station transmits the channel quality information report and/or the sounding reference symbol to the base station in subframe N, in case the mobile station is determined by the determining to be in DRX Active Time in subframe N.

According to an advantageous variant of the method of the fourth embodiment of the invention which can be used in addition or alternatively to the above, the base station determines whether the mobile station will be in DRX Active Time or DRX Non-Active Time in subframe N, at least based on MAC control elements, relating to the DRX operation, for which an acknowledgment is received from the mobile station until and including subframe N−(3+k), where k is an integer value from 1 to K. The base station receives the channel quality information report and/or the sounding reference symbol from the mobile station in subframe N, in case the mobile station is determined by the determining step to be in DRX Active Time in subframe N.

According to an advantageous variant of the method of the fourth embodiment of the invention which can be used in addition or alternatively to the above, the determining is further based on DRX-related timers running for the mobile station, including at least one of a DRX Inactivity Timer, a DRX OnDuration Timer and a DRX Retransmission Timer. Preferably this may be done by estimating the state of the DRX-related timers at subframe N based on uplink resource grants for the uplink shared channel and/or downlink resource assignments for the downlink shared channel, received by the mobile station until and including subframe N−4 only, and further based on the value of the DRX-related timers at subframe N−4

According to an advantageous variant of the method of the fourth embodiment of the invention which can be used in addition or alternatively to the above, the determining disregards any MAC control elements, relating to the DRX operation, for which an acknowledgement is transmitted by the mobile station in subframes N−(2+k) to N.

According to an advantageous variant of the method of the fourth embodiment of the invention which can be used in addition or alternatively to the above, the determining is further based on uplink resource grants for the uplink shared channel and/or downlink resource assignments for the downlink shared channel, received by the mobile station until and including subframe N−4 only.

The present invention further provides a mobile station of the fourth embodiment for transmitting a channel quality information report and/or a sounding reference symbol to a base station in a mobile communication system in subframe N. Subframe N is configured for the mobile station for transmission of periodic channel quality information reports and/or periodic sounding reference symbols. A processor of the mobile station determines whether the mobile station will be in DRX Active Time or DRX Non-Active Time in subframe N, at least based on MAC control elements, relating to the DRX operation, for which an acknowledgment is transmitted by the mobile station until and including subframe N−(3+k), where k is an integer value from 1 to K. A transmitter of the mobile station transmits the channel quality information report and/or the sounding reference symbol to the base station in subframe N, in case the mobile station is determined by the processor to be in DRX Active Time in subframe N.

According to an advantageous variant of the mobile station of the fourth embodiment of the invention which can be used in addition or alternatively to the above, the processor performs the determining further based on DRX-related timers running for the mobile station, including at least one of a DRX Inactivity Timer, a DRX OnDuration Timer and a DRX Retransmission Timer. Alternatively, the processor performs the determining further based on uplink resource grants for the uplink shared channel and/or downlink resource assignments for the downlink shared channel, received by the mobile station until and including subframe N−4 only.

According to an advantageous variant of the mobile station of the fourth embodiment of the invention which can be used in addition or alternatively to the above, the processor performs the determining by disregarding any MAC control elements, relating to the DRX operation, for which an acknowledgement is transmitted by the mobile station in subframes N−(2+k) to N.

The present invention further provides a base station of the fourth embodiment for receiving a channel quality information report and/or a sounding reference symbol from a mobile station a mobile communication system in subframe N. Subframe N is configured for the mobile station for transmission of periodic channel quality information reports and/or periodic sounding reference symbols. A processor of the base station determines whether the mobile station will be in DRX Active Time or DRX Non-Active Time in subframe N, at least based on MAC control elements, relating to the DRX operation, for which an acknowledgment is received from the mobile station until and including subframe N−(3+k), where k is an integer value from 1 to K. A receiver of the base station receives the channel quality information report and/or the sounding reference symbol from the mobile station in subframe N, in case the mobile station is determined by the determining step to be in DRX Active Time in subframe N.

The present invention further provides a method of a fifth embodiment for transmitting a channel quality information report and/or a sounding reference symbol from a mobile station to a base station in a mobile communication system, in subframe N. Subframe N is configured for the mobile station for transmission of periodic channel quality information reports and/or periodic sounding reference symbols. The mobile station transmits the channel quality information report and/or the sounding reference symbol to the base station in subframe N, in case the mobile station is in DRX Active Time in subframe N-k, where k is an integer value from 1 to K.

The present invention further provides a mobile station of the fifth embodiment for transmitting a channel quality information report and/or a sounding reference symbol to a base station in a mobile communication system in subframe N. Subframe N is configured for the mobile station for transmission of periodic channel quality information reports and/or periodic sounding reference symbols. A transmitter of the mobile station transmits the channel quality information report and/or the sounding reference symbol to the base station in subframe N, in case the mobile station is in DRX Active Time in subframe N-k, where k is an integer value from 1 to K.

The present invention further provides a base station of the fifth embodiment for receiving a channel quality information report and/or a sounding reference symbol from a mobile station a mobile communication system in subframe N. Subframe N is configured for the mobile station for transmission of periodic channel quality information reports and/or periodic sounding reference symbols. A receiver of the base station receives the channel quality information report and/or the sounding reference symbol to the base station in subframe N, in case the mobile station is in DRX Active Time in subframe N−k, where k is an integer value from 1 to K.

BRIEF DESCRIPTION OF THE SEVERAL VIEWS OF THE DRAWINGS

In the following the invention is described in more detail with reference to the attached figures and drawings.

FIGS. 9 to 12 are subframe diagrams illustrating the mobile terminal and base station operation for the first embodiment of the invention, for different scenarios depending on the subframe at which a PDCCH is received, FIGS. 13 and 14 are subframe diagrams illustrating the mobile terminal and base station operation and a remaining problem of ambiguousness, FIGS. 17 to 19 are subframe diagrams illustrating the mobile terminal and base station operation for the fourth embodiment of the invention, and FIG. 20 is a subframe diagram illustrating the mobile terminal and base station operation for the fifth embodiment of the invention.

DETAILED DESCRIPTION

Figure 1:
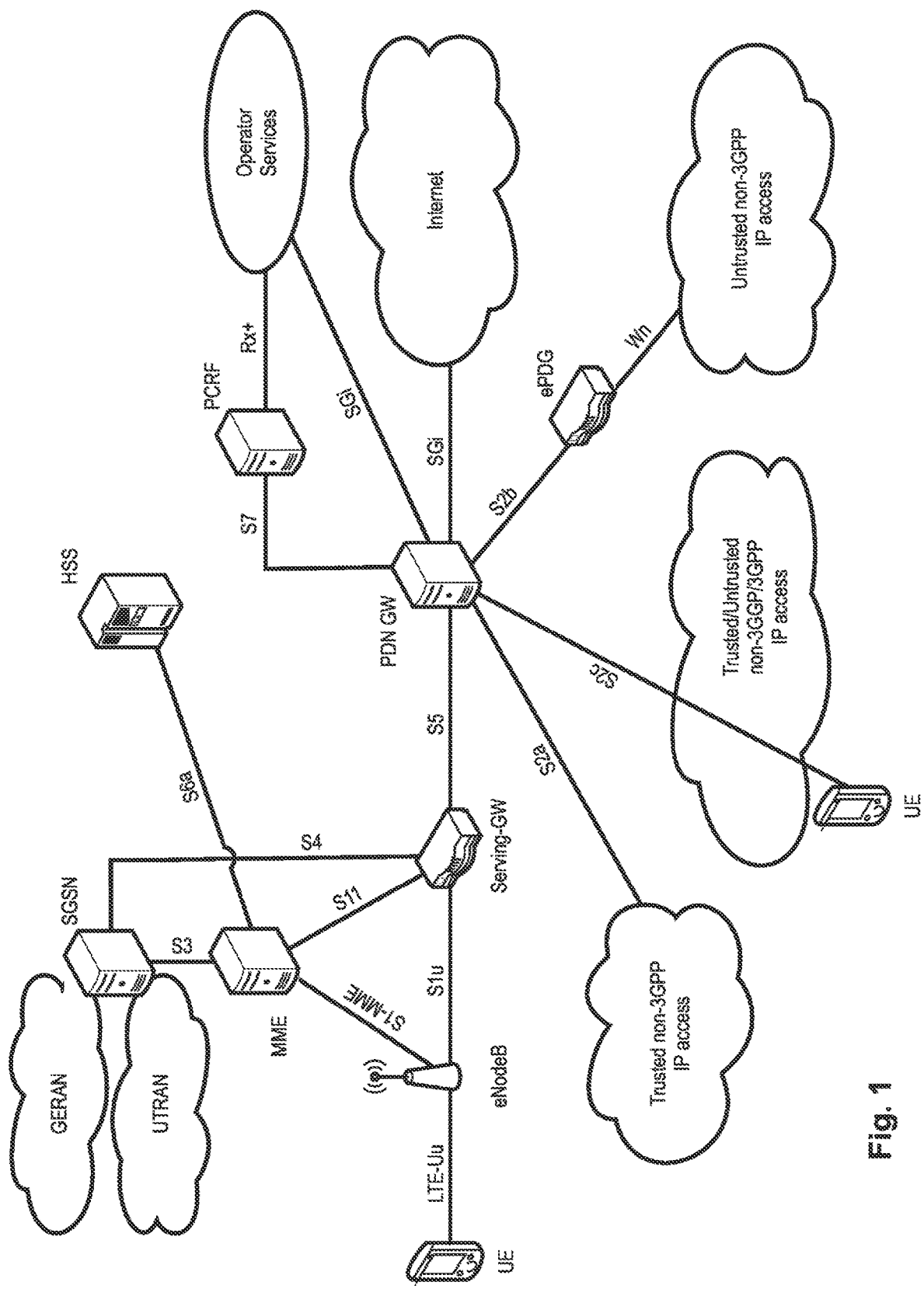
FIG. 1 shows an exemplary architecture of a 3GPP LTE system.
Figure 2:
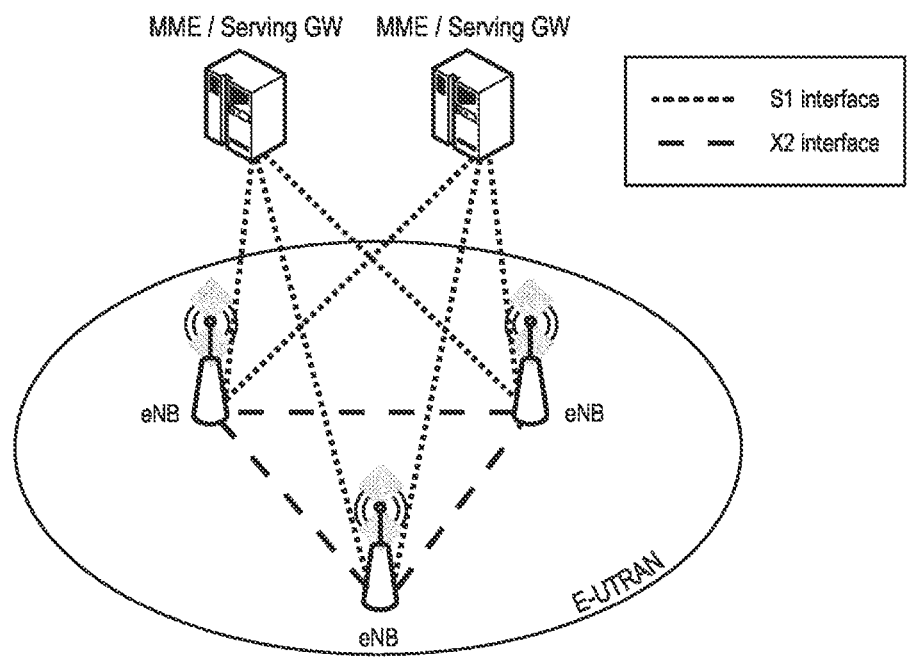
FIG. 2 shows an exemplary overview of the overall E-UTRAN architecture of 3GPP LTE.
Figure 3:
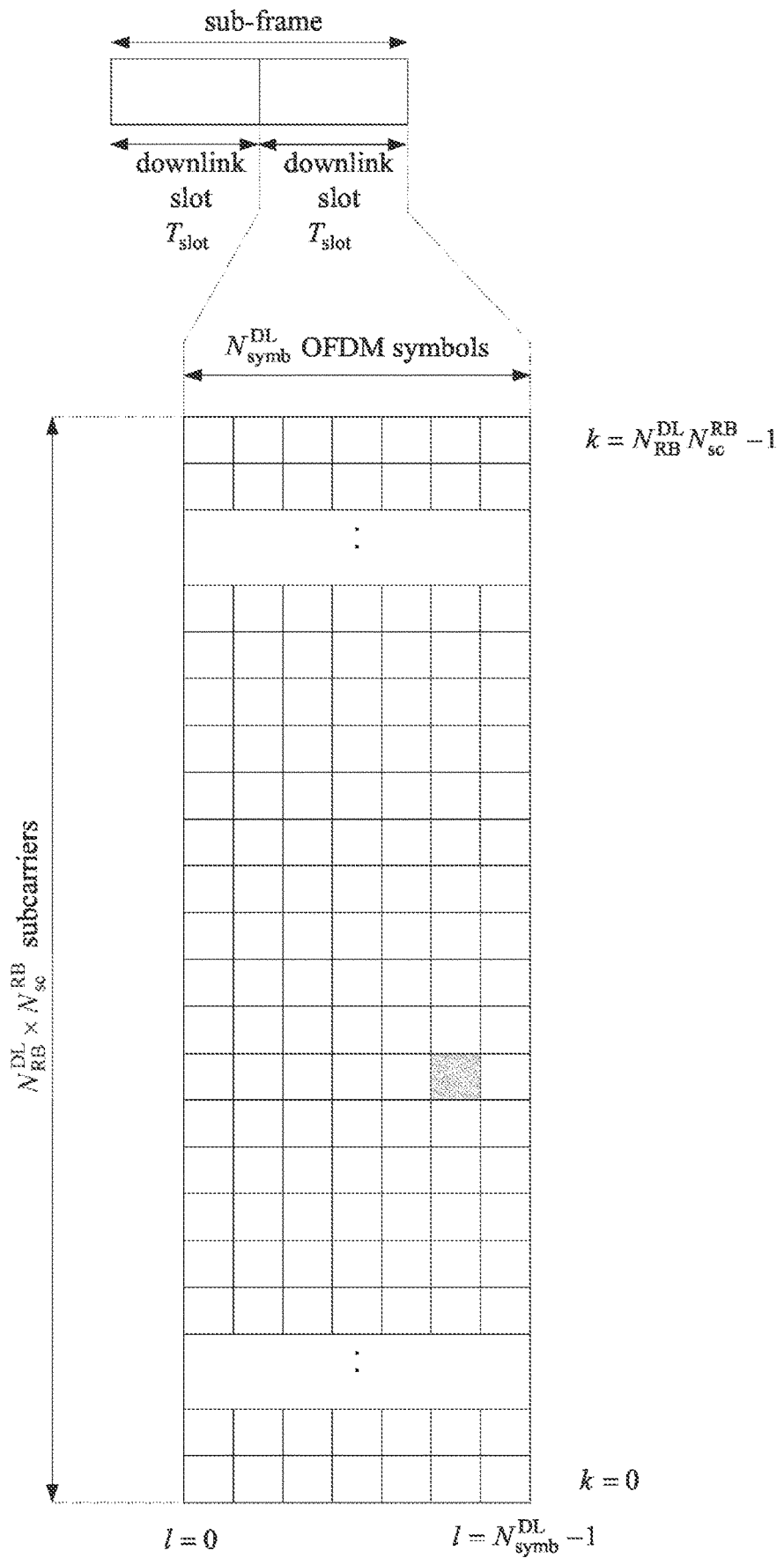
FIG. 3 shows exemplary subframe boundaries on a downlink component carrier as defined for 3GPP LTE (Release 8/9)
Figure 4:
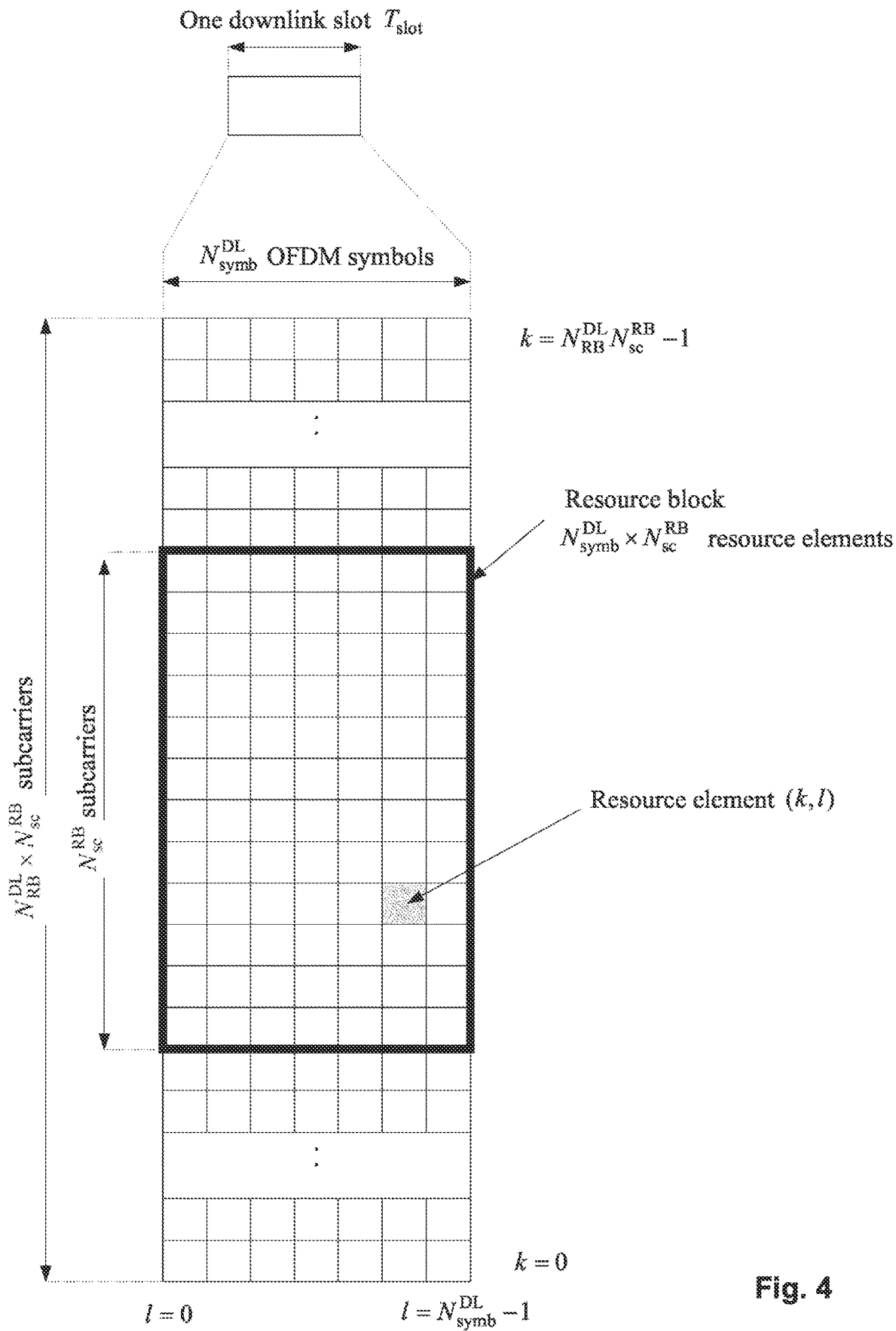
FIG. 4 shows an exemplary downlink resource grid of a downlink slot as defined for 3GPP LTE (Release 8/9)
Figure 5:
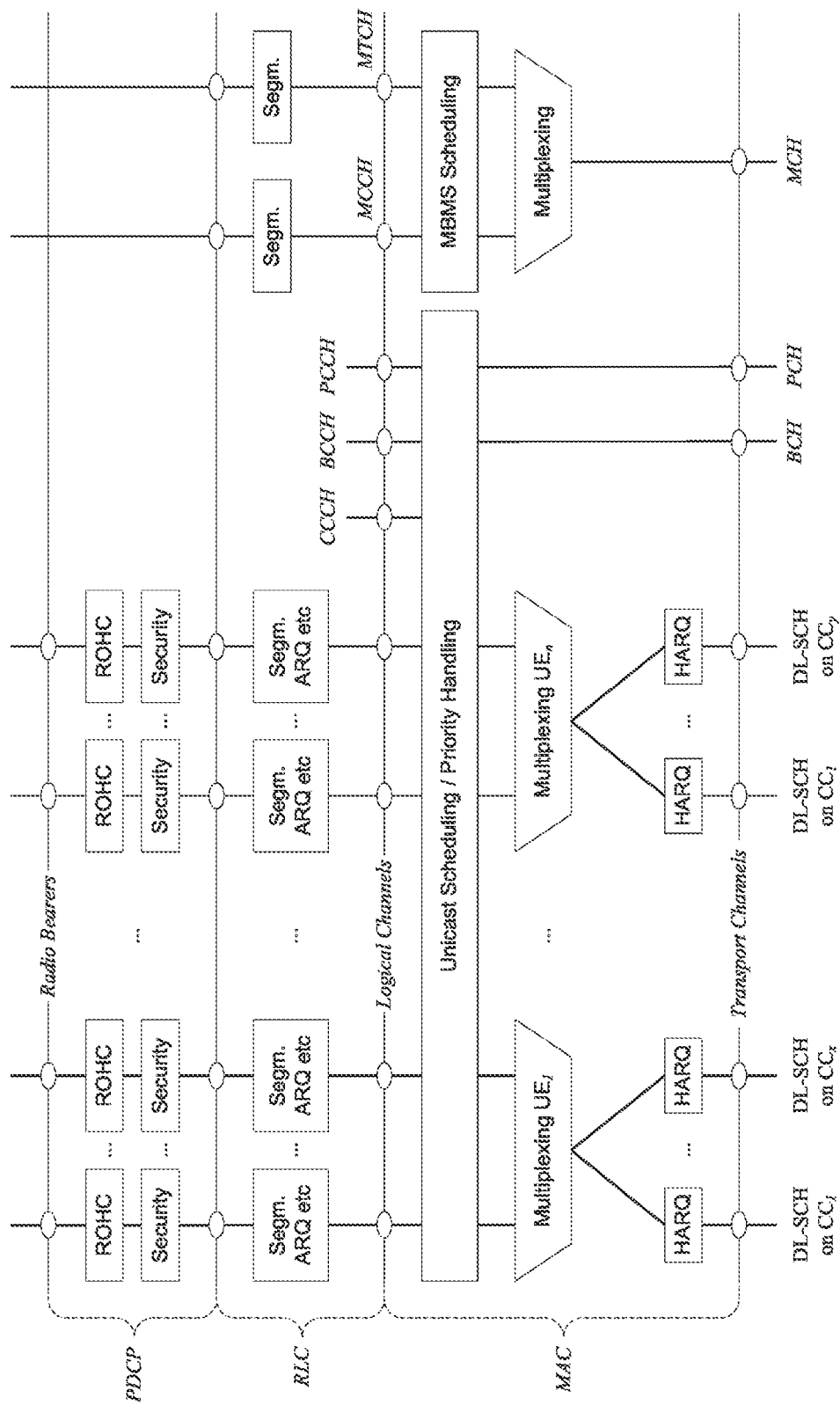
FIGS. 5 & 6 show the 3GPP LTE-A (Release 10) Layer 2 structure with activated carrier aggregation for the downlink and uplink, respectively.
Figure 6:
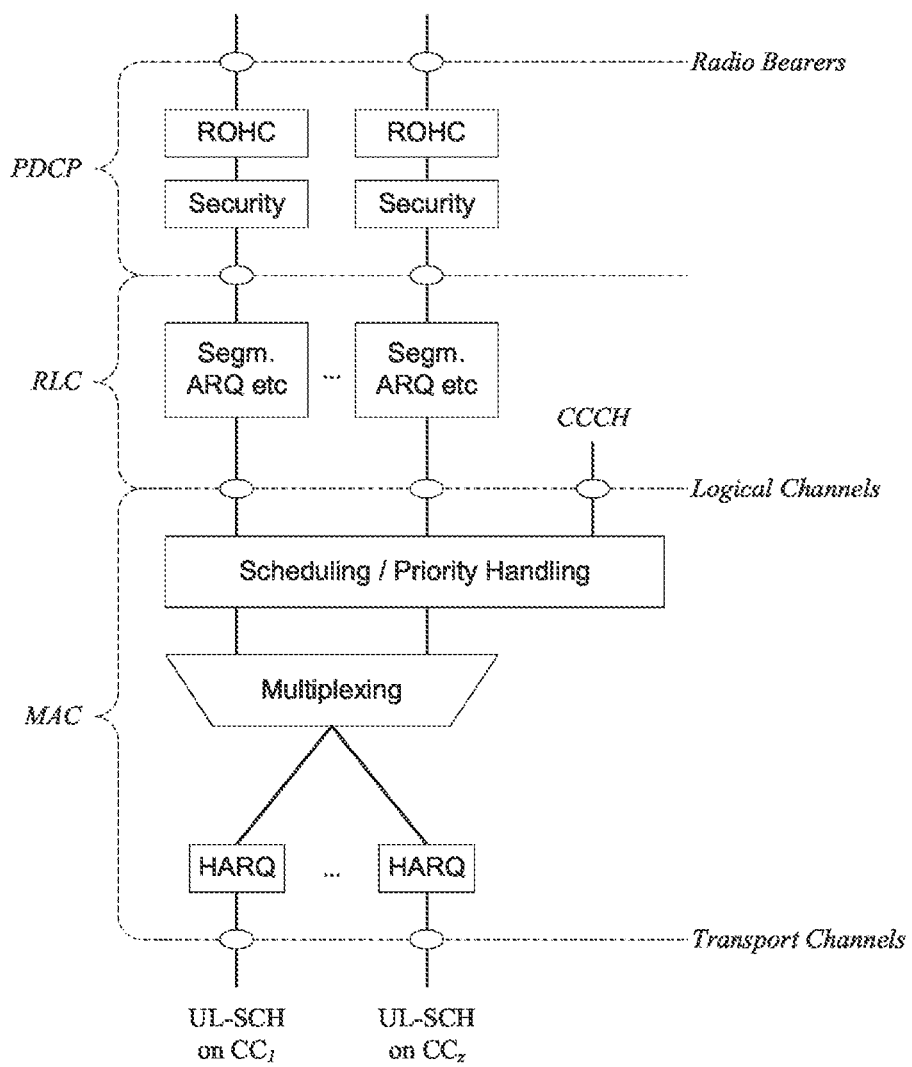
Figure 7:
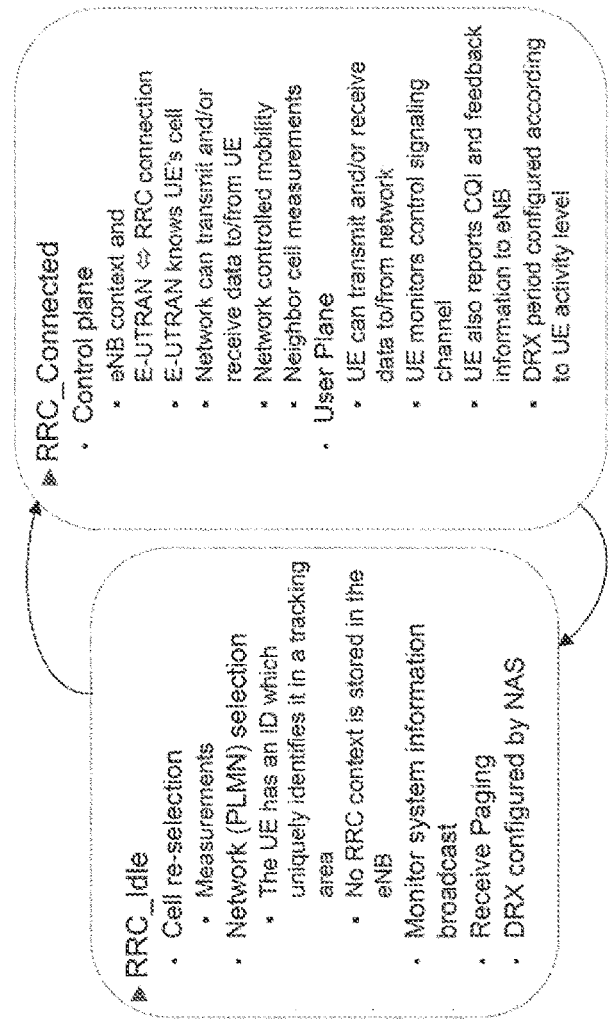
FIG. 7 shows a state diagram for a mobile terminal and in particular the states RRC_CONNECTED and RRC_IDLE and the functions to be performed by the mobile terminal in these states.
Figure 8:
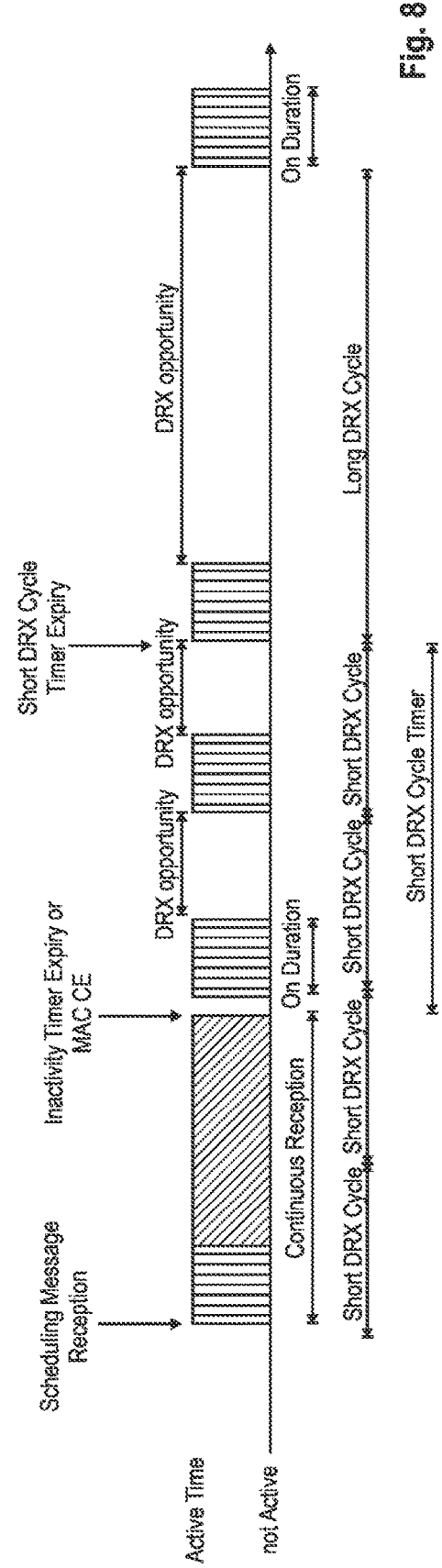
FIG. 8 illustrates the DRX operation of a mobile terminal, and in particular the DRX opportunity, on-duration, according to the short and long DRX cycle.

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

The term "DRX status" used in the claims and also throughout the description refers to the mobile station being either in "DRX Active Time" or in "DRX Non-Active Time". The "DRX Active Time" mainly denotes the time during which the mobile station is monitoring the PDCCH and performs others tasks such as transmission of periodic SRS and/or periodic CSI, as configured. The "DRX Non-Active Time" mainly denotes the time during which the mobile station does not monitor the PDCCH and does not transmit the periodic SRS and/or periodic CSI.

The expression "until and including subframe N−4 only", and similar expressions for N−(4+k) etc., used in the claims and also throughout the description, shall limit the subframes which are to be considered for the determination. The expression correspondingly refers to only those subframes N−4, N−5, N−6, N−7, N−8, N−9 etc. Correspondingly, subframes N−3, N−2, N−1 and current subframe N are not to be included according to the expression and thus are disregarded (discarded), i.e., not considered, for the determination. Another equivalent expression is "only subframes before subframe N−3".

The expression "at subframe N−4", and similar expressions referring to other subframe indices, used in the description, should not be necessarily understood as meaning that the process (e.g., estimating) is to be performed completely in said indicated subframe, but rather that the process is started in said indicated subframe, and may well proceed to subsequent subframes if the processing as such needs more time to be terminated. This of course partly depends on the implementation of the mobile station or base station executing said process.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

One main aspect of the invention is to make the determination of whether or not to transmit the CSI/SRS deterministic, i.e., where the result of the determination may be determined in advance; or put differently, no randomness is involved.

For the following embodiments of the invention, it is assumed that subframe N is configured for periodic CSI/SRS reporting. For ease of explanation, it is assumed that periodic CSI and periodic SRS are configured for the same subframe (i.e., subframe N); however, this is not necessarily always the case. The embodiments of the invention may well be applied to cases where the periodic CSI and SRS are configured for different subframes, in which case the embodiments of the invention are to be applied separately for CSI and SRS.

Furthermore, the Figures discussed below to explain the various embodiments of the invention assume the ideal situation where the processing time at the UE/eNodeB is negligible and not taken into account for illustration purposes. Of course, in real world implementation the UEs and eNodeB need a certain processing time (e.g., several subframes) to properly decode a downlink transmission and process the decoded information accordingly. For example, after receiving a DRX MAC CE instruction to enter DRX, the UE is supposed to immediately enter DRX mode in the next subframe according to the standard; however, this will not be possible in reality, since the UE will need time to process the DRX MAC CE and may actually only enter DRX with a, e.g., 2 subframe delay.

First Embodiment

According to a first set of embodiments of the invention, instead of acting according to the DRX status at the time of the actual uplink transmission, the UE estimates at subframe N−4 the DRX status of a subframe which is 4 subframes ahead (i.e., subframe N) and decides based on the estimated status whether to transmit the periodic CSI/SRS or not. For the estimation, the UE considers all PDCCHs (i.e., uplink resource grants and/or downlink resource assignments) which are received up to subframe N−4 (having possible influence on the DRX status of UE for subframe N), but does not consider any PDCCHs received after subframe N−4, i.e., at subframes N−3, N−2, N−1 and N. The reason why UE looks 4 subframes ahead, is that this corresponds to the same timing requirements as defined in the above-cited exception on the periodic CSI transmission on PUCCH and periodic SRS transmission introduced for LTE Rel-8/9/10 in TS 36.321.

Furthermore, the estimation is not only based on the UL grants/DL assignments as just mentioned but is also based on at least one of DRX-related timer(s) running for the mobile station at the time of subframe N, such as the Inactivity Timer, the OnDuration Timer, and/or the Retransmission Timer. The DRX timers usually have a direct influence on the DRX status of a subframe; i.e., whether or not the UE is in Active Time at subframe N. Not all timers may be running at the same time. Furthermore, not all of the DRX timers configured for the mobile station must be indeed considered; only a subset (e.g., one DRX timer) of the DRX timers could be taken into account. For example, it would be possible to just consider the OnDuration timer, but not the Retransmission Timer, even if same is currently running when performing the determination as to whether or not to transmit the CSI/SRS.

In particular, the UE estimates the values and status of the DRX timer(s) at subframe N and thus foresees whether it will be in Active Time or not in subframe N depending on the estimated DRX timer status/value at subframe N. Preferably of course, only those DRX-related timers should be considered whose value at subframe N may be extrapolated already at subframe N−4.

Again however, UE considers only those DRX timers whose value at subframe N are known already at subframe N−4, e.g., UE knows already at subframe N−4 based on grants/assignments received until and including subframe N−4 that OnDuration timer/DRX retransmission timer is running at subframe N; in case a DRX timer value is reset or the DRX timer is aborted due to the reception of a PDCCH, DRX MAC CE or a retransmission after subframe N−4 (i.e., in subframes N−3, N−2, N−1, N), this is not considered for the estimation. Correspondingly, the estimation considering the DRX-related timers is based on uplink resource grants for the uplink shared channel and/or downlink resource assignments for the downlink shared channel, received by the UE until and including subframe N−4 only, and further based on the estimation of status/values of the DRX-related timers at subframe N.

By additionally considering the DRX-related timer(s) the accuracy of the estimation of whether subframe N is Active Time or Non-Active Time for the mobile station, is increased and hence the usefulness of CSI/SRS is increased.

In general, the UE shall transmit CSI/SRS to the eNodeB in case the subframe N is estimated to be DRX Active, i.e., that the UE is in Active Time, based on the information explained above. On the other hand, the UE shall not transmit CSI/SRS to the eNodeB in case the subframe N is estimated to be DRX Non-Active, i.e., that the UE is in Non-Active Time, based on the information explained above. In both cases, the transmission of the CSI/SRS is depending on the estimation result for the DRX status, but is independent from the actual DRX status of the UE at subframe N; the latter one may differ from the estimated DRX status of the UE at subframe N. Correspondingly, the UE might have to transmit CSI/SRS even though the UE is in Non-Active Time at subframe N; or conversely, the UE does not transmit CSI/SRS even though the UE is in Active Time at subframe N.

The estimation of the subframe N status beforehand as explained above is performed at the eNodeB too. Thus, the eNodeB, having the same information as the UE with respect to the estimation, will get to the same result of the estimation, and thus knows whether the UE will transmit the CSI/SRS or not in subframe N. Accordingly, the eNodeB will expect the transmission of CSI/SRS by the UE at subframe N and will receive the CSI/SRS accordingly, in case of a positive estimation result, or will not expect and not try to receive the CSI/SRS in case of a negative estimation result. No double decoding at the eNodeB is necessary anymore, which leads to less eNodeB complexity. The estimation as explained is deterministic and thus leads to foreseeable results of the estimation for both the eNodeB and the UE.

Furthermore, this procedure basically provides the UE with 4 subframes for detecting the reception of the PDCCH and the preparing of the CSI/SRS transmission.

The above explanation will become clear in connection with the following FIG. 9-12.

FIGS. 9 and 10 illustrate the DRX operation of a mobile station and a base station for the transmission or non-transmission of CSI/SRS depending on the result of the estimation as will be explained. As apparent, it is assumed that the UE is in Active Time, the DRX Inactivity Timer is running and would expire in subframe N−2, provided no PDDCH is received before. A PDCCH (be it an uplink grant or a downlink assignment) is received in subframe N−3, and subframes N−10 and N are configured for periodic CSI/SRS transmission. Correspondingly, the UE reports CSI/SRS in subframe N−10 (not considered for explanation) and now needs to decide whether to report CSI/SRS in subframe N or not.

The UE as well as the eNodeB now determine whether or not the UE shall transmit CSI/SRS as configured in subframe N or not. Correspondingly, the determination is based on whether subframe N is determined to be Active or Non-Active for the UE. Put differently, information relating to the DRX status of a subframe, available until and including subframe N−4, is considered for the determination, while information available after subframe N−4 is discarded for the determination (but still processed accordingly for other processes).

Therefore, in FIG. 9 the PDCCH is received in subframe N−3, i.e., after subframe N−4, and thus discarded for the determination as to whether or not the UE shall transmit CSI/SRS in subframe N. On the other hand, the PDCCH of subframe N−3 is considered as such for restarting the DRX-Inactivity Timer according to usual UE behavior, which thus leads to the case that the UE remains in Active Time.

However, for the determination of whether to transmit or not the CSI/SRS, the UE and the eNodeB determine that the UE would be in Non-Active Time in subframe N (in contrast to the actual situation), for the following reason: until and including subframe N−4 no PDCCH was received to restart the DRX Inactivity Timer; thus, the UE and eNodeB determine, based on the current value of the DRX Inactivity Timer at subframe N−4, that the DRX Inactivity Timer will indeed expire in subframe N−2. Due to the assumed expiry of the DRX Inactivity Timer, the UE and the eNodeB determine that the UE will be in Non-Active Time in subframe N (which is not true, due to the not considered PDCCH in subframe N−3), and the UE will thus not transmit CSI/SRS contrary to the configuration (see FIG. 9, "No UL transmission"). The eNodeB will not expect any transmission of CSI/SRS from the UE and thus will not even try to receive CSI/SRS.

The exemplary scenario of FIG. 10 is quite similar to the one presented in FIG. 9, with the important exception that the PDCCH is received in subframe N−4 instead of in subframe N−3. Consequently, the determination as to whether to transmit or not the CSI/SRS at the configured subframe N, in this case also considers the PDCCH at subframe N−4. The DRX-Inactivity Timer is restarted in subframe N−4, due to the received PDCCH. The estimation process estimates the DRX status of the UE for subframe N to be Active Time (assuming that DRX-Inactivity Timer will not have expired at subframe N), which means that the UE shall report CSI/SRS as configured. The eNodeB reaches the same conclusion based on the same information, and thus expects the CSI/SRS reporting from the UE. No double decoding at the eNodeB is necessary anymore, since the eNB and UE reach the same unambiguous estimation result.

In FIG. 11 a different DRX scenario is presented, based on which the above-described first embodiment will be explained further. It is assumed that the UE is in DRX mode, in particular in the Short-DRX cycle, where OnDuration periods (Active Time) are alternated with DRX Opportunities (Non-Active Periods). In this example, the OnDuration is taken as three subframes long, with the Short-DRX cycle being 7 subframes long; the Non-Active Time is thus 4 subframes. Again, subframes N−10 and N are considered to be configured for periodic CSI/SRS reporting. The OnDuration Timer is running at the mobile station.

Since the above-explained embodiment also considers the DRX-related timers at the UE, the UE and the eNB can estimate at subframe N−4, considering grants/assignments received until and including subframe N−4, that the UE will be in Active Time in subframe N, i.e., OnDuration timer is running. By taking the Short-DRX cycle timer and the OnDuration Timer into account for the estimation, the UE as well as the eNB can exactly estimate when the UE will be in Active Time and Non-Active Time. Again, the UE and the eNodeB consider UL grants/DL assignments received up to and including subframe N−4 only, which in this case however means that no PDCCHs are considered since no PDCCHs are received recently. This in first instance means that the UE still remains in DRX mode, alternating Active Times with Non-Active Times. When only considering the UL grants/DL assignments, the UE/eNodeB would estimate that the UE is in Non-Active Time in subframe N, since no PDCCH was received in time (up to and including subframe N−4) to "wake up" the UE. However, by additionally considering the DRX-related timers at the subframe N−4 (in particular the value of the Short-DRX cycle timer and the OnDuration timer), it is foreseeable that the UE will be in Active Time in subframe N and thus shall report the CSI/SRS. Both the UE and the eNodeB come to the same determination result, and thus the UE transmits the CSI report and the SRS, and the eNodeB expects the CSI/SRS without the need of double decoding.

A similar scenario of the DRX operation is explained in connection with FIG. 12, where however, the OnDuration is only 2 subframes and the DRX opportunity is 5 subframes long. As apparent from FIG. 12, in subframes N−2 and N−1 the UE would be in Active Time of the OnDuration. In subframe N−2 the UE is supposed to receive a PDCCH (be it a UL grant or DL assignment). In any case, the UE ideally wakes up as of the reception of the PDCCH, i.e., as of subframe N−1 and starts the DRX-Inactivity Timer in subframe N−2. The UE is thus in Active Time in subframe N (assuming DRX-Inactivity Timer does not expire before subframe N) and should report the CSI/SRS as configured. This case is one example where the DRX reporting would fall into the transient phase after the reception of a PDCCH, where the eNodeB needs to perform double decoding to determine whether CSI/SRS is actually transmitted or not.

According to the present embodiment however, it is possible to arrive at a foreseeable behavior of the UE which avoids the need of double decoding at the eNodeB. According to the present embodiment, only UL grant and DL assignments are considered that are received until and including subframe N−4 for determining whether or not to transmit the periodic CSI/SRS as configured. The PDCCH is received at subframe N−2 and accordingly discarded for the estimation, which in combination with the DRX-related timer values/status leads to the estimation result that the UE is in Non-Active Time in subframe N, and thus the UE shall not transmit CSI/SRS to the eNodeB. Correspondingly, the UE does not transmit CSI/SRS although it is in Active Time at subframe N, due to the received PDCCH in subframe N−2.

Therefore, additionally considering DRX-related timers is beneficial and depending on the circumstance may lead to a different estimation result than without considering DRX-related timers. Although for the above-explained scenarios only some of the DRX-related were considered, the embodiment of the invention allows considering any one or any combination of the DRX-related timers, also depending on which DRX timers are currently running, such as the DRX-retransmission timer or the Long-DRX cycle timer. Thus, the embodiment of the invention shall not be restricted to merely the above-explained exemplary scenarios.

The reason why the consideration of OnDuration timer is appealing for the determination whether to send CSI/SRS or not is that the mobile can know beforehand when OnDuration timer is running based on the formula given in section 5.7 of TS36.321.

If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
start onDurationTimer.

As can be seen from the formula, the subframes where OnDuration timer is running can be unambiguously determined by the mobile station and the eNodeB for the different DRX cycles. However, whether DRX Short Cycle or DRX Long Cycle is used in a specific subframe depends on other factors like DRX-Inactivity timer status and correspondingly PDCCH reception status. Therefore, according to the above mentioned embodiment, UE will consider the grants/assignments received until and including subframe N−4 in order to determine whether OnDuration timer is running in subframe N, or in other words, UE will consider assignments/grants received until and including subframe N−4 only, in order to determine whether in subframe N DRX Short cycle or DRX Long Cycle is used and consequently whether OnDuration timer is running or not.

In a similar way the DRX-retransmission timer can be considered for the determination whether to send CSI/SRS info at a specific subframe. Since UE starts DRX-retransmission timer for the case that a transport block or PDSCH could not be decoded correctly in order to monitor PDCCH for further retransmissions of the transport block, UE knows already some subframes in advance whether DRX retransmission timer will be running in a specific subframe. For example when UE should determine whether to transmit periodic CSI/SRS at subframe N, UE knows already at subframe N−4 whether DRX-retransmission timer will be running at subframe N since HARQ feedback for a potential PDSCH transmission which might trigger the starting of DRX retransmission timer at subframe N would have been sent in subframe N−4. For example in case a PDSCH transmission was scheduled in subframe N−8 by a PDCCH which could not be correctly decoded, UE will sent a NACK at subframe N−4. Hence, the UE and also eNB know that UE will start the DRX retransmission timer at subframe N in order to monitor for potential retransmissions.

The above embodiment has been explained and illustrated in the figures as if no processing time would be necessary for the UE and the eNodeB to, e.g., perform the estimation of whether or not to transmit the CSI/SRS at subframe N or process incoming PDCCHs. Correspondingly, the above embodiment was explained as if the processing took place "at subframe N−4". However, the UE and eNodeB will need more time to decode the PDCCH, process the transport block of the PDCCH, estimate the DRX-status of subframe N and of course also for preparing the CSI/SRS. The processing may start at subframe N−4 and may well last for another one or two subframes. The more important part is that although the estimation may actually take place in, e.g., subframe N−3 (e.g., due to processing delay), only information (e.g., PDCCHs, DRX-timer values/status) until and including subframe N−4 are considered. Therefore, the time between subframe N−4 and subframe N may be considered as a time budget for the UE, to be used for amongst other: the decoding of the PDCCH, the processing of the transport block of the PDSCH, the estimation according to the embodiment, the preparation of the CSI/SRS (if transmission is to be done). This applies in a similar manner to the remaining embodiments, explained below.

As explained above, the processing according to the first embodiment of the invention (applies similarly also to the remaining embodiments explained below) may only need to be performed four subframes before the subframe being configured for CSI and/or SRS; i.e., at subframe N−4 for configured subframe N However, from the view-point of implementation, the UE and/or eNodeB may also perform the estimation at every subframe N, independently from whether or not periodic CSI and/or periodic SRS are even configured for subframe N+4. Although this may lead to significant more processing, the complexity of the UE and eNodeB can be reduced.

The following exemplary text, reflecting the above-explained first embodiment of the invention, is suggested to be implemented in the 3GPP specification TS 36.321, in section 5.7:

- if the PDCCH indicates a new transmission (DL or UL):
  - start or restart drx-InactivityTimer.
  - in current subframe n, if the UE would not be in Active Time according to grants/assignments received until and including subframe n−4 and onDurationTimer and drx-RetransmissionTimer would not be running according to grants/assignments received until and including subframe n−4, type-0-triggered SRS [2] shall not be reported.
- if CQI masking (cqi-Mask) is setup by upper layers:
  - in current subframe n, if onDurationTimer would not be running according to grants/assignments received until and including subframe n−4, CQI/PMI/RI/PTI on PUCCH shall not be reported.
  - else:
    - in current subframe n, if the UE would not be in Active Time according to grants/assignments received until and including subframe n−4 and onDurationTimer and drx-RetransmissionTimer would not be running according to grants/assignments received until and including subframe n−4, CQI/PMI/RI/PTI on PUCCH shall not be reported.

Regardless of whether the UE is monitoring PDCCH or not, the UE receives and transmits HARQ feedback and transmits type-1-triggered SRS [2] when such is expected.
    NOTE:    The same active time applies to all activated serving cell(s).

Second Embodiment

The second embodiment of the invention deals with the problem that some unpredictable UE behavior remains for the case of DRX MAC control elements being received by the UE from the eNodeB, instructing the UE to enter DRX, i.e., to go into DRX mode and thus become Non-Active. In other words, the eNodeB does not know which transmission format will be used by the UE in subframe N, depending on whether or not CSI/SRS is transmitted (e.g., Format 1 a vs Format 2a, see table for PUCCH format in background section). This problem will be explained in more detail in connection with FIGS. 13 and 14 illustrating DRX diagrams where a processing according to the first embodiment is performed.

It is assumed that subframes N−10 and N are configured for periodic CSI/SRS transmission. A PDCCH with a downlink resource assignment for a DRX MAC CE in the PDSCH is received in subframe N−4, as well as the DRX MAC CE via the PDSCH. The DRX MAC CE is an instruction from the eNodeB for the UE to enter DRX mode, i.e., to start, e.g., the DRX-Short cycle (not depicted). HARQ is applied to the PDSCH containing the DRX MAC CE, for which reason the UE shall transmit a HARQ feedback (ACK/NACK) to the eNodeB at subframe N.

However, the eNodeB does not know whether the UE received the DRX MAC CE sent in subframe N−4 correctly, without decoding the HARQ feedback (ACK/NACK) at subframe N. The estimation of the DRX status for the UE at subframe N depends on whether the UE received the MAC CE correctly or not. In case the DRX MAC CE is received correctly in subframe N−4, the UE goes into Non-Active Time as of subframe N−3 (ideally) and thus transmits an ACK without reporting CSI and transmitting SRS in subframe N (see FIG. 13).

In the other case, the UE fails to decode the DRX MAC CE correctly, thus stays in Active Time and transmits a NACK and CSI/SRS in subframe N (see FIG. 14). Correspondingly, the eNodeB still needs to implement double decoding to cover for the above-described cases, which increases complexity of the eNodeB. A corresponding re-transmission of the DRX MAC CE is performed at the earliest 8 subframes after the initial transmission (according to configuration), and in the exemplary configuration of FIG. 14 is assumed to be 9 subframes after initial transmission in subframe N+5. It is assumed that the DRX MAC CE this time is decoded correctly, and thus the UE goes into DRX, Non-Active Time.

According to the second embodiment, the estimation as to whether or not to transmit the periodic CSI/SRS as configured considers only DRX MAC CEs received until and including subframe N−(4+k), where k is an integer of 1 to K, and subframe N is the subframe configured for periodic CSI and/or SRS. This ensures that the eNodeB knows in subframe N already whether the DRX MAC was correctly received by the UE or not. It may thus already know the transmission format used in subframe N.

Based on this estimation, a transmission of the periodic CSI and/or SRS is controlled such that in case it is estimated that the UE will be in Active Time in subframe N, CSI/SRS is transmitted, and in case it is estimated that the UE will be in Non-Active Time in subframe N, CSI/SRS is not transmitted. Based on the scenario of FIGS. 13 and 14, the result of applying the second embodiment of the invention is illustrated in FIGS. 15 and 16.

Figure 15:
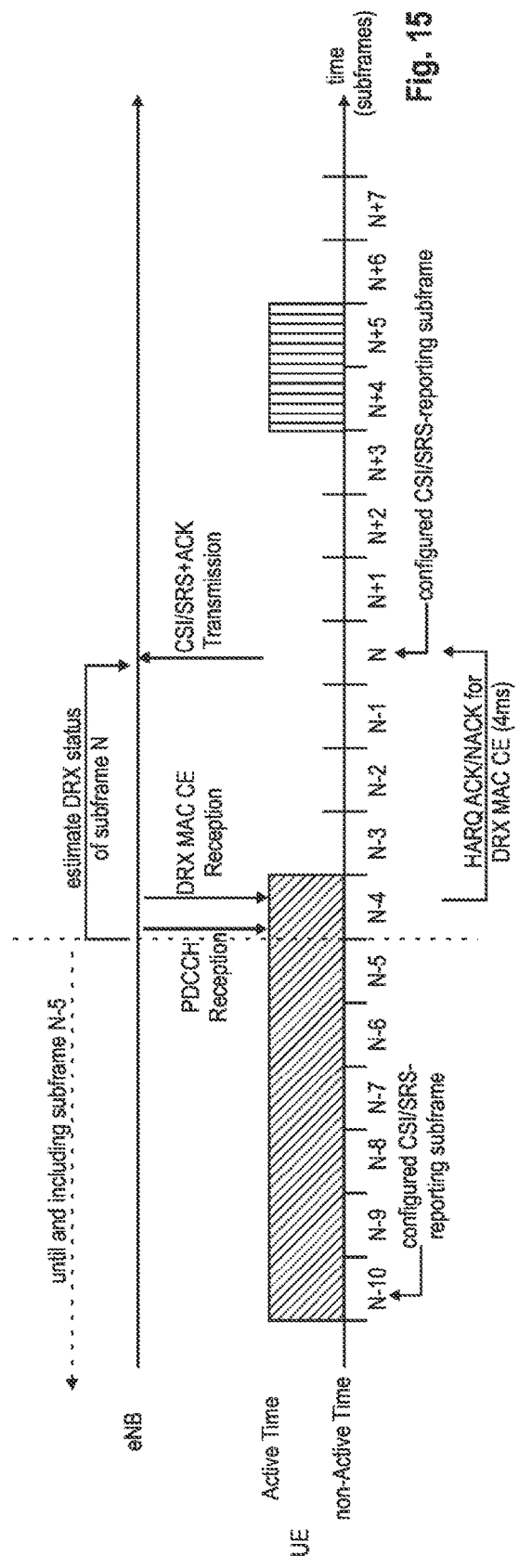
FIGS. 15 and 16 are subframe diagrams illustrating the mobile terminal and base station operation for the second embodiment of the invention.
Figure 16:
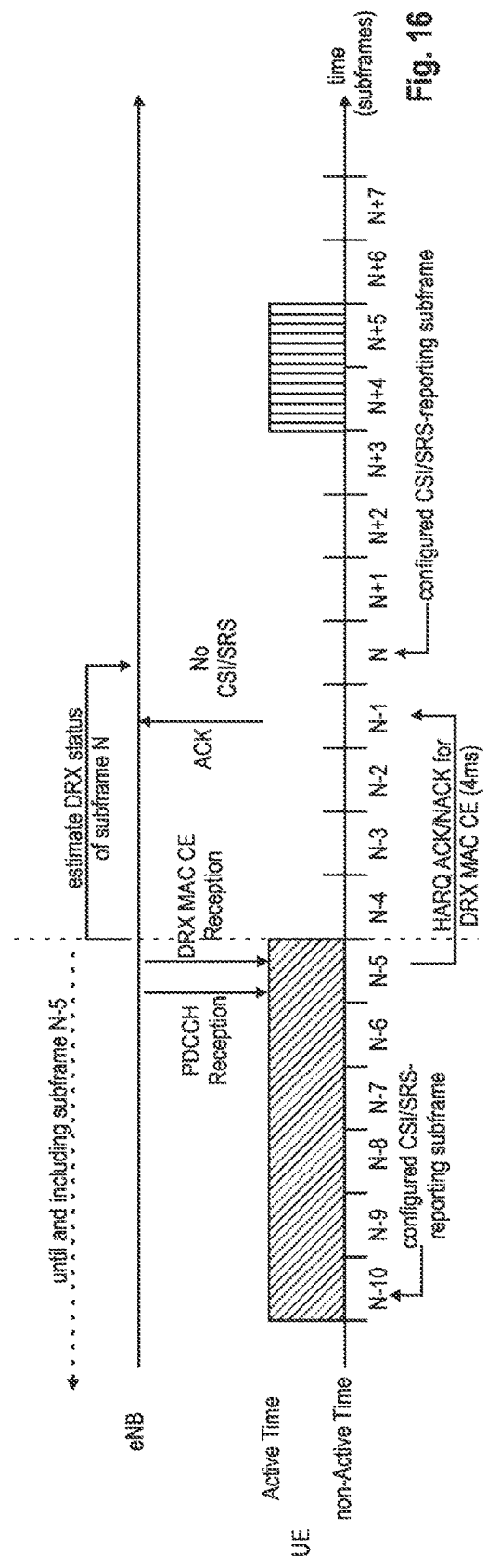

For the exemplary embodiment of FIG. 15 and FIG. 16, k=1 is assumed, such that only DRX MAC CEs received by the UE until and including subframe N−5 are to be considered for determining whether or not to transmit CSI/SRS as configured in subframe N. Thus, as apparent from FIG. 15, DRX MAC CE received in subframe N−4 is not considered for the estimation process, for which reason CSI/SRS is transmitted in subframe N together with the HARQ feedback (in the example of FIG. 15, an ACK). The eNodeB, performing the same determination and reaching the same result, expects the transmission of the CSI/SRS and a HARQ feedback for the DRX MAC CE. No double decoding is necessary. (ACK/NACK can be decoded without double decoding).

The exemplary scenario of FIG. 16 assumes that the DRX MAC CE (and the corresponding PDCCH) is received in subframe N−5, instead of subframe N−4. It is further assumed that the DRX MAC CE was correctly decoded by the UE, which thus exits the Active Time and enters DRX Non-Active Time as of subframe N−4. According to the HARQ processing, an ACK is transmitted from the UE to the eNodeB four subframes after the DRX MAC CE, i.e., in subframe N−1. Correspondingly, the eNodeB receives the HARQ feedback (e.g., ACK) and can deduce whether the DRX MAC CE was decoded correctly and applied by the UE. Therefore, the UE estimates that it will be in Non-Active Time in subframe N based on the correct reception of the DRX MAC CE, and thus does not transmit the periodic CSI/SRS. The eNodeB, receiving the ACK, as HARQ feedback, also determines that the UE will be in Non-Active Time in subframe and thus does not expect any reception of the CSI/SRS.

Although the above explanation focused on k=1, i.e., considering DRX MAC CEs received until and including subframe N−5, k may take other values too, such as 2, 3, 4 etc. Using a higher k value increases the internal processing time available to the eNB for processing the received HARQ feedback for a MAC CE and for deciding the expected PUCCH format to properly detect and decode the PUCCH in subframe N.

Although the above second embodiment of the invention was described so far as a standalone embodiment of the invention, being alternatively to the first embodiment, the second embodiment and the first embodiment may well be combined. Correspondingly, the UE estimates the DRX status of itself for subframe N, and thus also whether or not to transmit the periodic CSI/SRS in subframe N based on:

the UL grants and/or DL assignments received until and including subframe N−4 and also on the DRX-related timers at subframe N−4 (as described for the first embodiment), and the DRX MAC CEs received by the UE until and including subframe N−(4+k) (according to the second embodiment.

Therefore, different subframe periods are used for considering grants/assignments and the DRX-related timer and for considering the DRX MAC CEs.

Still alternatively, instead of also considering the DRX-related timers as explained in connection with the first embodiment, the UE may estimate the DRX status of itself in subframe N, and thus also whether or not to transmit the periodic CSI/SRS in subframe N based on:

the UL grants and/or DL assignments received until and including subframe N−4, and the DRX MAC CEs received by the UE until and including subframe N−(4+k) (according to the second embodiment).

As already explained above for the first embodiment, the processing according to the second embodiment of the invention may only need to be performed five (or N−(4+k)) subframes before the subframe being configured for CSI and/or SRS. However, from the view-point of implementation, the UE and/or eNodeB may also perform the estimation at every subframe N, independently from whether or not periodic CSI and/or periodic SRS are even configured for subframe N+(4+k). Although this may lead to significant more processing, the complexity of the UE and eNodeB can be reduced.

The following exemplary text, reflecting the above-explained second embodiment of the invention, is suggested to be implemented in the 3GPP specification TS 36.321, in section 5.7

---

- if the PDCCH indicates a new transmission (DL or UL):
  - start or restart drx-InactivityTimer.
- in current subframe n, if the UE would not be in Active Time according to grants/assignments received until and including subframe n−4 and MAC Control elements received until and including subframe n−(4+k) , type-0-triggered SRS [2] shall not be reported.
  - if CQI masking (cqi-Mask) is setup by upper layers:
    - in current subframe n, if onDurationTimer would not be running according to grants/assignments received until and includingsubframe n−4, CQI/PMI/RI/PTI on PUCCH shall not be reported.
  - else:
    - in current subframe n, if the UE would not be in Active Time according to grants/assignments received until and including subframe n−4 and MAC Control elements received until and including subframe n−(4+k), CQI/PMI/RI/PTI on PUCCH shall not be reported.

Regardless of whether the UE is monitoring PDCCH or not, the UE receives and transmits HARQ feedback and transmits type-1-triggered SRS [2] when such is expected.

NOTE: The same active time applies to all activated serving cell(s).

---

Third Embodiment

In contrast to the second embodiment according to which different time periods (N−(4+k) vs N−4) were considered for the different kinds of information used for the determination as to whether or not to transmit the CSI/SRS in subframe N, in the present third embodiment the same time period (N−(4+k)) is assumed for all kinds of information as will be explained in the following.

According to one variant of the previous second embodiment, DRX MAC control elements that are received until and including subframe N−(4+k) are considered for the estimation as well as UL grants/DL assignments received until and including subframe N−4; in a further alternative variant DRX-related timers may be additionally considered for the estimation to improve the estimation. Thus, information of different subframe periods is used.

According to the third embodiment, information as available at subframe N−(4+k) is used consistently for the estimation according to any of the above variants of the second embodiment. Therefore, the present third embodiment of the invention is closely related to any of the variants of the second embodiment, albeit changing the valid time periods of the information considered for the estimation.

In particular, the UE and the eNodeB determine whether or not the UE is in Active Time for subframe N and thus whether it shall transmit periodic CSI/SRS as configured at subframe N based on UL grants/DL assignments received by the UE until and including subframe N−(4+k) where k is a positive integer value of 1 to K. Likewise and as already explained before, DRX MAC CEs received by the UE until and including subframe N−(4+k) are also considered for the determination. In case DRX-related timers are additionally considered for the estimation, the status of the DRX-related timers, e.g., DRX OnDuration timer and DRX-retransmission timer, for subframe N estimated at subframe N−(4+k), i.e., considering grants/assignments received until and including subframe N−(4+k), are to be considered, rather than at subframe N−4 as before.

By using the same timing consideration of N−(4+k), the implementation of the invention in the UE and the eNodeB is simplified.

The following exemplary text, reflecting the above-explained third embodiment of the invention, is suggested to be implemented in the 3GPP specification TS 36.321, in section 5.7

---

- if the PDCCH indicates a new transmission (DL or UL):
    - start or restart drx-InactivityTimer.
- in current subframe n, if the UE would not be in Active Time according to grants/assignments and MAC Control elements received until and including subframe n−(4+k), type-0-triggered SRS [2] shall not be reported.
    - if CQI masking (cqi-Mask) is setup by upper layers:
        - in current subframe n, if onDurationTimer would not be running according to grants/assignments received until and including subframe n−4, CQI/PMI/RI/PTI on PUCCH shall not be reported.
    - else:
        - in current subframe n, if the UE would not be in Active Time according to grants/assignments and MAC control elements received until and including subframe n−(4+k), CQI/PMI/RI/PTI on PUCCH shall not be reported.
Regardless of whether the UE is monitoring PDCCH or not, the UE receives and transmits HARQ feedback and transmits type-1-triggered SRS [2] when such is expected.
    NOTE: The same active time applies to all activated serving cell(s).

---

Fourth Embodiment

The fourth embodiment of the invention deals also with the problem caused by the reception of DRX MAC control elements, as already explained for the second embodiment (see above). However, instead of considering DRX MAC CEs received by the UE until and including subframe N−(4+k) according to the second embodiment, only DRX MAC CEs are considered for the estimation for which an Acknowledgement (HARQ feedback) has been sent from the UE to the eNodeB until and including subframe N−(3+k); k is a positive integer from 1 to K. The advantage is that both the eNodeB and the UE have the same understanding of what information is taken into account for determining whether to send or not periodic CSI/SRS in subframe N. The fourth embodiment will be explained in connection with FIGS. 17 to 19.

As apparent from FIG. 17, k=1 is assumed for the exemplary illustrations of FIG. 17-19, such that only DRX MAC CEs are considered for which an ACK is fed back to the eNodeB up to and including subframe N−4. Further, it is assumed that the PDCCH, indicating the transmission for the DRX MAC CE on PDSCH, and the DRX MAC CE are received in subframe N−8. Provided that the UE successfully detects the PDSCH, based on the PDCCH, and decodes the DRX MAC CE, instructing the UE to enter DRX (i.e., Non-Active Time), the UE will (ideally) enter DRX-mode and become Non-Active as of subframe N−7. This is an ideal assumption as explained before; in reality a UE will only know at about subframe N−5 that it has received in DRX MAC CE and can hence go to DRX Non-Active Time. Furthermore, the UE will send the HARQ feedback ACK in subframe N−4.

The UE determines whether or not to transmit the periodic CSI/SRS as configured for subframe N, based on the Acknowledgment for the DRX MAC CE sent at subframe N−4. Correspondingly, the DRX MAC CE is acknowledged in subframe N−4, i.e., ACK is sent to the eNodeB, and thus the UE determines that it will not transmit the CSI/SRS as configured in subframe N, since it will be in Non-Active Time in subframe N. In a similar manner, the eNodeB expects and receives the HARQ feedback ACK in subframe N−4, and thus determines that the UE will not transmit the periodic CSI/SRS in subframe N. No double decoding is necessary.

FIG. 18 is similar to the exemplary scenario in FIG. 17, with the difference that it is assumed that the DRX MAC CE was not successfully decoded by the UE, which thus transmits a NACK HARQ feedback to the eNodeB in subframe N−4, and stays Active accordingly. Since no Acknowledgement was sent for the DRX MAC CE until and including subframe N−4, but rather a NACK, the UE determines that it will send periodic CSI/SRS in subframe N. The eNodeB reaches the same conclusion, since it receives the NACK of subframe N−4 and thus learns that the UE could not decode and properly apply the DRX MAC CE.

As apparent from FIG. 18, the eNodeB after receiving the NACK for the DRX MAC CE from the UE, retransmits the DRX MAC CE 9 subframes after the initial transmission. After the retransmission, the UE is assumed to be able to decode the DRX MAC CE correctly and to thus enter DRX mode, in particular Non-Active Time. A corresponding HARQ feedback ACK for the retransmitted DRX MAC CE is transmitted in subframe N+5.

FIG. 19 illustrates an exemplary scenario, similar to the one of FIGS. 17 and 18, but with the significant difference that the DRX MAC CE is received in subframe N−7, not subframe N−8. Correspondingly, the HARQ feedback for the reception of the DRX MAC CE is transmitted from the UE to the eNodeB four subframes after the reception, i.e., at subframe N−3, and thus outside of the window defined for being considered for the determination of whether or not to transmit the periodic CSI/SRS in subframe N. Therefore, the DRX MAC CE received by the UE in subframe N−7 is discarded for the determination, although it is of course properly processed by other functions of the UE. Therefore, for the determination of whether or not to transmit the periodic CSI/SRS in subframe N, it is irrelevant whether the DRX MAC CE is successfully decoded or not; only DRX MAC CEs are considered in said respect, for which an ACK is transmitted until and including subframe N−4, which is not the case in the exemplary scenario of FIG. 19.

Correspondingly, in case the UE is able to successfully process the DRX MAC CE it will enter DRX, i.e., become Non-Active, but still has to transmit CSI/SRS in subframe N, although it would not be in Active Time at subframe N according to DRX.

The following exemplary text, reflecting the above-explained fourth embodiment of the invention, is suggested to be implemented in the 3GPP specification TS 36.321, in section 5.7

---

- if the PDCCH indicates a new transmission (DL or UL):
  - start or restart drx-InactivityTimer.
- in current subframe n, if the UE would not be in Active Time according to grants/assignments received until and including subframe n−4 and according to MAC Control elements for which a HARQ feedback has been sent until and including subframe n−(3+k), type-0-triggered SRS [2] shall not be reported.
  - if CQI masking (cqi-Mask) is setup by upper layers:
    - in current subframe n, if onDurationTimer would not be running according to grants/assignments received until and including subframe n−4, CQI/PMI/RI/PTI on PUCCH shall not be reported.
  - else:
    - in current subframe n, if the UE would not be in Active Time according to grants/assignments received until and including subframe n−4 and according to MAC Control elements for which a HARQ feedback has been sent until and including subframe n−(3+k), CQI/PMI/RI/PTI on PUCCH shall not be reported.

Regardless of whether the UE is monitoring PDCCH or not, the UE receives and transmits HARQ feedback and transmits type-1-triggered SRS [2] when such is expected.

NOTE: The same active time applies to all activated serving cell(s).

---

Fifth Embodiment

A further fifth embodiment of the invention considerably differs from the previous embodiments, and mainly avoids the ambiguousness of the CSI/SRS transmission from the UE in the transient phases, by considering a DRX status of a previous subframe N-k for the determination of whether or not to transmit the periodic CSI/SRS in subframe N.

In more detail, the UE shall transmit the periodic CSI and/or SRS to the eNodeB as configured for subframe N, in case the UE is in Active Time in subframe N-k, where k is a positive integer from 1 to K. This fifth embodiment provides a simple behavior for the UE and eNodeB, but still ensuring predictability of the CSI/SRS transmission to avoid the double decoding at the eNodeB.

k=4 is assumed for illustration purposes. Correspondingly, for the decision as to whether or not to transmit the periodic CSI/SRS as configured for subframe N, the UE takes the DRX status (i.e., Active Time or Non-Active Time) in subframe N−4 and assumes for the determination same to be the DRX status of subframe N. Correspondingly, based on the general rule that periodic CSI/SRS is only to be transmitted by the UE when in Active Time, the UE can thus determine whether or not to transmit the periodic CSI/SRS in subframe N based on the DRX status of subframe N−4.

FIG. 20 illustrates the exemplary scenario of FIG. 19, but with the fifth embodiment applied, instead of applying the fourth embodiment. Accordingly, it is assumed that a PDCCH and the DRX MAC CE indicated by the PDCCH, are received in subframe N−7, that the UE correctly decodes the DRX MAC CE and thus (ideally) enters the DRX Non-Active time as of subframe N−6. An Ack is transmitted as the HARQ feedback for the DRX MAC CE in subframe N−3 to the eNodeB.

For determining whether to transmit the periodic CSI/SRS or not in subframe N, the UE determines whether it is in Active Time in subframe N−4 or not. Since the UE is not in Active Time in subframe N−4, due to the correctly decoded DRX MAC CE received previously, the UE will determine not to transmit the CSI/SRS. The eNodeB makes the similar determination and comes to the result that the UE will not transmit the CSI/SRS since the UE is in Non-Active Time in subframe N−4, which is the relevant DRX status for transmitting CSI/SRS in subframe N.

Although not depicted, when the DRX MAC CE is not correctly decoded by the UE, which thus does not enter Non-Active time as of subframe N−6 but remains Active, the UE will be in Active time in subframe N−4, and thus CSI/SRS will be reported at subframe N as configured. Correspondingly, eNodeB comes to the same determination result, and thus expects and receives the periodic CSI/SRS in subframe N.

This fifth embodiment reduces the complexity of the implementation for both the UE and eNodeB, while solving the problem of avoiding double decoding at the eNodeB.

Although this alternative approach is more simple from the view point of implementation, it should be noted that on the other hand, since only the DRX status of subframe N-k is considered for deciding whether to transmit CSI/SRS in subframe N or not, the usability of CSI/SRS info for scheduling might be reduced. The CSI/SRS reporting period is basically shifted by k subframes compared to the DRX Active Time, i.e., CSI/SRS reporting starts k subframes after DRX Active Time is started, and ends k subframes after DRX Active Time ends.

The following exemplary text, reflecting the above-explained fifth embodiment of the invention, is suggested to be implemented in the 3GPP specification TS 36.321, in section 5.7

---

- if the PDCCH indicates a new transmission (DL or UL):
  - start or restart drx-InactivityTimer.
  - in current subframe n, if the UE was not in Active Time in subframe n−4, type-0-triggered SRS [2] shall not be reported.
  - if CQI masking (cqi-Mask) is setup by upper layers:
    - in current subframe n, if onDurationTimer would not be running according to grants/assignments received until and including subframe n−4, CQI/PMI/RI/PTI on PUCCH shall not be reported.
  - else:
    - in current subframe n, if the UE was not in Active Time in subframe n−4, CQI/PMI/RI/PTI on PUCCH shall not be reported.

Regardless of whether the UE is monitoring PDCCH or not, the UE receives and transmits HARQ feedback and transmits type-1-triggered SRS [2] when such is expected.

NOTE: The same active time applies to all activated serving cell(s).

---

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
a transmitter which, in operation, transmits configuration information for receiving, in subframe N in an uplink, at least one of a channel quality information report or a sounding reference symbol, and transmits a media access control (MAC) control element regarding a discontinuous reception (DRX) operation,
wherein the MAC control element transmitted until and including subframe N−(4+k) is used to determine whether a user equipment will be in DRX Active Time or DRX Non-Active Time in subframe N, where k is an integer value equal to or greater than 1, and
a receiver which, in operation, does not receive the channel quality information report or the sounding reference symbol in subframe N, in case the user equipment is determined to be not in DRX Active Time in subframe N.

2. The communication apparatus according to claim 1, which is configured to receive at least one of the channel quality information report or the sounding reference symbol periodically.

3. The communication apparatus according to claim 1, wherein at least one of uplink resource grants for an uplink shared channel or downlink resource assignments for a downlink shared channel, which are transmitted by the communication apparatus until and including subframe N−(4+k), are additionally used to determine whether the user equipment will be in DRX Active Time or DRX Non-Active Time in subframe N.

4. The communication apparatus according to claim 1, wherein the receiver, in operation, receives at least one of the channel quality information report or the sounding reference symbol in subframe N, in case the user equipment is determined to be in DRX Active Time in subframe N.

5. The communication apparatus according to claim 1, wherein DRX-related timers running for the user equipment including at least one of a DRX Inactivity Timer, a DRX OnDuration Timer, or a DRX Retransmission Timer, are additionally used to determine whether the user equipment will be in DRX Active Time or DRX Non-Active Time in subframe N.

6. The communication apparatus according to claim 1, wherein radio resource control (RRC) signaling restricts periodic transmission of channel quality information reports to only during the DRX Active Time.

7. The communication apparatus according to claim 1, wherein any MAC control element regarding a DRX operation in subframes N−(3+k) to N is disregarded by the user equipment.

8. The communication apparatus according to claim 1, wherein the integer value of k is equal to 1.

9. A method performed by a communication apparatus, comprising:
transmitting configuration information for receiving, in subframe N in an uplink, at least one of a channel quality information report or a sounding reference symbol, and
transmitting a media access control (MAC) control element regarding a discontinuous reception (DRX) operation,
wherein the MAC control element transmitted until and including subframe N−(4+k) is used to determine whether a user equipment will be in DRX Active Time or DRX Non-Active Time in subframe N, where k is an integer value equal to or greater than 1, and
not receiving the channel quality information report or the sounding reference symbol in subframe N, in case the user equipment is determined to be not in DRX Active Time in subframe N.

10. The method according to claim 9, comprising:
receiving at least one of the channel quality information report or the sounding reference symbol periodically.

11. The method according to claim 9, wherein at least one of uplink resource grants for an uplink shared channel or downlink resource assignments for a downlink shared channel, which are transmitted by the communication apparatus until and including subframe N−(4+k), are additionally used to determine whether the user equipment will be in DRX Active Time or DRX Non-Active Time in subframe N.

12. The method according to claim 9, comprising:
receiving at least one of the channel quality information report or the sounding reference symbol in subframe N, in case the user equipment apparatus is determined to be in DRX Active Time in subframe N.

13. The method according to claim 9, wherein DRX-related timers running for the user equipment including at least one of a DRX Inactivity Timer, a DRX OnDuration Timer, or a DRX Retransmission Timer, are additionally used to determine whether the user equipment will be in DRX Active Time or DRX Non-Active Time in subframe N.

14. The method according to claim 9, wherein radio resource control (RRC) signaling restricts periodic transmission of channel quality information reports to only during the DRX Active Time.

15. The method according to claim 9, wherein any MAC control element regarding a DRX operation in subframes N−(3+k) to N is disregarded by the user equipment.

16. The method according to claim 9, wherein the integer value of k is equal to 1.

\* \* \* \* \*